(12) United States Patent
Nevin et al.

(10) Patent No.: US 11,951,717 B2
(45) Date of Patent: Apr. 9, 2024

(54) TILE FOR REDUCING A RADAR WAVE REFLECTION AND A METHOD FOR PRODUCING A TILE FOR REDUCING A RADAR WAVE REFLECTION

(71) Applicant: Trelleborg Retford Limited, Tewkesbury (GB)

(72) Inventors: Adam Christopher Nevin, Nottingham (GB); Andrew Ian Williams, Nottingham (GB); Philip Wayne Brindle, Nottingham (GB); Paul Geary, Nottingham (GB); Gary Critchlow, Nottingham (GB); Sina Saremi-Yarahmadi, Nottingham (GB)

(73) Assignee: Trelleborg Retford Limited, Tewkesbury (GB)

( * ) Notice: Subject to any disclaimer, the term of this patent is extended or adjusted under 35 U.S.C. 154(b) by 108 days.

(21) Appl. No.: 17/416,202

(22) PCT Filed: Dec. 19, 2019

(86) PCT No.: PCT/EP2019/086289
§ 371 (c)(1),
(2) Date: Jun. 18, 2021

(87) PCT Pub. No.: WO2020/127719
PCT Pub. Date: Jun. 25, 2020

(65) Prior Publication Data
US 2022/0143957 A1  May 12, 2022

(30) Foreign Application Priority Data
Dec. 20, 2018 (EP) .................................... 18214625

(51) Int. Cl.
*B32B 27/08* (2006.01)
*B32B 27/20* (2006.01)
(Continued)

(52) U.S. Cl.
CPC .............. *B32B 27/08* (2013.01); *B32B 27/20* (2013.01); *B32B 27/40* (2013.01); *H01Q 17/005* (2013.01);
(Continued)

(58) Field of Classification Search
CPC .......................... B29C 48/21; B29K 2075/00; B29K 2509/00; B29K 2995/0003;
(Continued)

(56) References Cited

U.S. PATENT DOCUMENTS 3,568,195 A   3/1971 Wesch et al.
4,538,151 A   8/1985 Hatakeyama et al.
(Continued)

FOREIGN PATENT DOCUMENTS

CA   2919935 C   8/2018
DE   102010055850 A1   6/2012
(Continued)

OTHER PUBLICATIONS

Mohd, Idris Fadzidah, et al., "Recent Developments of Smart Electromagnetic Absorbers Based Polymer-Composites at Gigahertz Frequencies", Journal of Nagnetism and Magnetic Materials, Elsevier, Amsterdam, NL, vol. 405, Dec. 22, 2015.
(Continued)

*Primary Examiner* — Lawrence D Ferguson
(74) *Attorney, Agent, or Firm* — Flaster Greenberg P.C.

(57) ABSTRACT

A tile for reducing a radar wave reflection from a surface, the tile being a flexible surface sheet which is adhesively attachable to the surface, wherein the flexible surface sheet reduces the radar wave reflection from the surface at a frequency, the frequency being a frequency between 1 GHz and 12 GHz; and, wherein the flexible surface sheet is a laminate of layers, wherein at least one of a top surface and a bottom surface of the flexible surface sheet is adapted to
(Continued)

be adhesively attachable to the surface, and wherein the laminate of layers comprises: a first layer comprising a polymer matrix into which a particulate filler is dispersed, wherein the particulate filler has radar absorbing properties; a second layer comprising a polymer matrix, the second layer adjoining the first layer, wherein the polymer matrix of at least one of the first and the second layer is thermoplastic polyurethane.

15 Claims, 14 Drawing Sheets

(51) Int. Cl.
    *B32B 27/40*     (2006.01)
    *H01Q 17/00*     (2006.01)
    *B29C 48/21*     (2019.01)
    *B29K 75/00*     (2006.01)
    *B29K 509/00*     (2006.01)

(52) U.S. Cl.
    CPC .......... *B29C 48/21* (2019.02); *B29K 2075/00* (2013.01); *B29K 2509/00* (2013.01); *B29K 2995/0003* (2013.01); *B32B 2264/102* (2013.01); *B32B 2264/108* (2013.01); *B32B 2264/12* (2013.01); *B32B 2264/403* (2020.08); *B32B 2274/00* (2013.01); *B32B 2307/20* (2013.01); *B32B 2307/732* (2013.01); *B32B 2405/00* (2013.01); *B32B 2603/00* (2013.01)

(58) Field of Classification Search
    CPC ........ B32B 2264/102; B32B 2264/105; B32B 2264/108; B32B 2264/12; B32B 2264/403; B32B 2274/00; B32B 2307/20; B32B 2307/732; B32B 2405/00; B32B 2603/00; B32B 27/08; B32B 27/18; B32B 27/20; B32B 27/40; H01Q 17/00; H01Q 17/005

See application file for complete search history.

(56) References Cited

U.S. PATENT DOCUMENTS

| | | |
|---|---|---|
| 2009/0021415 A1 | 1/2009 | Yu et al. |
| 2013/0017096 A1 | 1/2013 | Holley |
| 2013/0135135 A1 | 5/2013 | Appleton |
| 2014/0118177 A1 | 5/2014 | Appleton |
| 2015/0305212 A1 | 10/2015 | Sarto et al. |
| 2016/0035456 A1 | 2/2016 | Sauro et al. |

FOREIGN PATENT DOCUMENTS

| | | |
|---|---|---|
| EP | 2529205 B1 | 6/2018 |
| GB | 1074898 A | 7/1967 |
| GB | 2526795 A | 12/2015 |
| WO | 2011051687 A2 | 5/2011 |

OTHER PUBLICATIONS

Green, et al., "Ferric metal-organic framework 9fe-MOF) for Microwave Absorption", Manuscript (made available under Elsevier user license), 2018, 26 pages.

Manna, et al., "Fe3O4@Carbon@Polyaniline Trilaminar Core-Shell Composites as Superior Microwave Absorber in Shielding of Electromagnetic Pollution", ACS Sustainable Chem. Eng. 2017, 5, 2017, 10710-10721.

Montazeri, et al., "Separatation of the defect-free Fe3O4—Au core/shell fraction from magnetite-gold composite nanoparticles by an acid wash treatment", Journal of Nanostructure in Chemistry 2013 3:25, Apr. 30, 2013, 6 pages.

Saini, et al., "Tensile Properties of Highly Filled Magnetic Polymeric Composites", Journal of Composite Materials, vol. 21, Sep. 1987, 16 pages.

Yin, et al., "Enhanced high-frequency absorption off anisotropicFe3O4/ graphene nanocomposites", Scientific Reports [6:25075] DOI:10.1038/srep25705, May 4, 2016, 10 pages.

TILE FOR REDUCING A RADAR WAVE REFLECTION AND A METHOD FOR PRODUCING A TILE FOR REDUCING A RADAR WAVE REFLECTION

CROSS-REFERENCE TO RELATED APPLICATIONS

This application is the 371 National Stage of International Application No. PCT/EP2019/086289, filed Dec. 19, 2019, which claims priority to European Application No. 18214625.8, filed Dec. 20, 2018, the disclosures of which are incorporated herein by reference in their entireties.

TECHNICAL FIELD

The present invention relates, in general, to coatings to be attached to a surface of an object such that reflections from radar waves impinging on the surface are reduced. More particularly, the invention relates to tiles which provide such a coating to surfaces of structures in the vicinity of an airport.

BACKGROUND

Radar systems are often used at airports. For example, air traffic control radars and weather radars are common. Structures in the vicinity of the airport may cause radar wave reflections which interfere with the radar system. Metal structures, such as e.g. wind turbines, are especially reflective.

In EP2632699B1 a composite structure incorporating radar absorbing material is disclosed, wherein the composite structure may form part of a wind turbine, e.g. a wind turbine blade. However, such structures must be designed and incorporated in the wind turbine during the manufacturing process.

SUMMARY

It is an object of the invention to improve existing means for reducing radar wave reflections from surfaces. In particular, it is an object to improve means for reducing radar wave reflections which interfere with airport radar systems.

These and other objects of the invention are at least partly met by the invention as defined in the independent claims. Preferred embodiments are set out in the dependent claims.

According to a first aspect of the invention, there is provided a tile for reducing a radar wave reflection from a surface, the tile being a flexible surface sheet which is adhesively attachable to the surface,
wherein the flexible surface sheet reduces the radar wave reflection from the surface at a frequency, the frequency being a frequency between 1 GHz and 12 GHz; and,
wherein the flexible surface sheet is a laminate of layers, wherein at least one of a top surface and a bottom surface of the flexible surface sheet is adapted to be adhesively attachable to the surface, and
wherein the laminate of layers comprises:
a first layer comprising a polymer matrix into which a particulate filler is dispersed, wherein the particulate filler has radar absorbing properties; and,
a second layer comprising a polymer matrix, the second layer adjoining the first layer,
wherein the polymer matrix of at least one of the first and the second layer is thermoplastic polyurethane.

An advantage of providing a tile may be that a radar absorbing coating may be provided to an existing structure. The radar absorbing coating may not need to be applied during construction of the structure, it may e.g. be applied to the structure while it is being assembled or retrofitted to an existing structure. Structures which do not interfere with the radar system may then be provided at a lower cost. Structures may not need to be custom built.

Another advantage, may be that the tile may be arranged to have a predefined total thickness, predefined thicknesses of the individual layers, predefined filler compositions and quantities in the individual layers. As the radar absorption properties, e.g. the radar absorption frequency and the attenuation of the radar reflection, may depend on these parameters it may be advantageous to use a tile wherein the parameters are predefined. For example, when a radar system is installed with a specific frequency, tiles matching that frequency may be acquired and structures in the vicinity of the radar system may easily be fitted with a radar absorbing coating by adhesively attaching the tiles, e.g. side by side, to cover parts of the surface of the structure. Another advantage may be that the tiles may be attached by a person with little or no training. Another advantage may be that fewer people are required to attach the tiles. Arranging a large sheet on a surface may e.g. require several people. In contrast, a single person could arrange a number of smaller tiles to cover the same area more easily. Painting on a radar attenuating coating may require skilled workers to get the thickness and radar attenuating properties right. In contrast, it may be very difficult to get the radar attenuating properties wrong when tiles with predefined parameters are used.

The inventors have found that a tile according to the first aspect of the invention may effectively reduce an S-band radar wave reflection from the surface. S-band radars may be particularly common at airports, e.g. for terminal air traffic control. An S-band radar herein refers to a radar having a frequency between 2 GHz and 4 GHz.

The inventors have also found that a tile according to the first aspect of the invention may effectively reduce a X-band radar wave reflection from the surface. X-band radars may be particularly common at airports, e.g. precision approach radar. A X-band radar herein refers to a radar having a frequency between 8 GHz and 12 GHz.

The inventors have also found that a tile according to the first aspect of the invention may effectively reduce a C-band radar wave reflection from the surface. C-band radars may be used at airports, e.g. as weather radar. A C-band radar herein refers to a radar having a frequency between 4 GHz and 8 GHz.

Another advantage may be that providing a tile in the form of a flexible surface sheet allows for the tile to easily conform to the surface of the structure. As the radar attenuation properties, e.g. the radar attenuating frequency and the attenuation of the radar reflection, may depend on the distance between a layer and the radar reflective surface it may be important to ensure that the tile conforms to the surface and adhesively attaches everywhere. A flexible surface sheet may also allow the tile to follow curved parts of the surface such that a larger part of the structure may be covered with tiles, thereby reducing the radar cross-section of the structure effectively. When the flexible surface sheet conforms well to the surface the formation of creases and blisters may be avoided. A crease may e.g. result in the thickness of the radar absorbing coating being larger than intended. A blister may e.g. result in an air filled pocket between the surface and the radar absorbing coating such that the distance between the surface and the respective layers becomes larger than intended. Both creases and blisters may degrade the radar attenuating properties of the radar absorbing coating. Both creases and blisters may degrade aerodynamic properties of the structure to which the radar absorbing coating is attached, e.g. a wind turbine blade. It should be understood that the term flexible surface sheet may herein refer to a surface sheet wherein the stress at 100% strain is below 500 MPa. It should also be understood that in some embodiments the term flexible surface sheet may herein refer to a surface sheet wherein the stress at 100% strain is below 50 MPa.

Another advantage may be that tiles may have a size restriction. Small tiles may be combined to effectively cover an irregularly shaped structure. For example, a wind turbine blade may have a surface which, e.g. for aerodynamic and structural reasons, comprises both concave and convex parts, and/or elliptic points, and/or hyperbolic points, and/or parabolic points. Covering such a structure with a large sheet may be hard without forming creases or blisters. Smaller tiles may conform to the surface conditions locally and the bending of one tile may not affect the surrounding tiles. For example, the tile may have a size restriction in two directions, e.g. a width smaller than e.g. 300 mm and a length smaller than 600 mm, or a width smaller than e.g. 500 mm and a length smaller than 1000 mm. Such tiles may reduce the risk of forming creases and blisters effectively and may be arranged to reach into corners, nooks and crannies. The length of the tile may also be substantially longer than the width, e.g. at least a factor 10 longer. For example, the width may be 300 mm while the length is at least 3000 mm. Such tiles may be cut to an appropriate length before being adhesively attached to a surface. For example, a tile may be arranged with its width along the vertical direction of a wind turbine tower. The length may then be cut to match the circumference of the tower at the point where the tile is attached. Since the tower often is tapered such a tile may be used at any height. The fact that the width is restricted in size may prevent creases and blisters forming as the tile is being applied while the long length reduces the amount of tiles that need to be attached individually. Cutting a tile to the right length and wrapping it around the tower at a given height before moving on to the next tile above may be a fast way to apply the tiles.

It should be understood that tiles with size restrictions in two directions as well as tiles with a substantially longer length than width may be used both to cover wind turbine towers and wind turbine blades. It should also be understood that tile may refer to a slab of arbitrary shape. For example, the tile may be rectangular, e.g. quadratic or oblong. Other examples of shapes are parallelograms or polygons. An example of a polygon shape may be hexagonal. It may be advantageous if one single tile type, wherein all tiles have the same shape and/or size, can be used to cover a surface. However, several tile types may also be combined.

An advantage of the tile being a laminate of layers may be that multiple layers may reduce a radar wave reflection more effectively than a single layer. The tiles may thereby reduce the radar wave reflection better. Alternatively or additionally, thinner and/or lighter tiles may be produced. This may make it easier to install the tiles. It may also reduce the negative impact on the performance of a wind turbine that the radar absorbing coating may have. For example, a lighter radar absorbing coating on the wind turbine blades may be better than a heavier radar absorbing coating. The layers may e.g. be arranged such that reflections from the air to tile interface and/or reflections from a layer to layer interface or interfaces may interfere destructively with the reflection from the tile to surface interface, the surface herein referring to the surface which the tile is adhesively attached to. The reduction of the radar wave reflection from the surface may then be caused by a combination of absorption in one or more layers and destructive interference with one or more reflections from the air to tile interface and/or layer to layer interfaces. Destructive interference between reflections from two interfaces may be facilitated by ensuring that the reflections have opposite phase. This may be done e.g. by arranging the interfaces such that the distance between the interfaces is a quarter of the wavelength for the radar wave which should be reduced, wherein the wavelength refers to the wavelength within the material. Ensuring that the reflections have opposite phase may also be done e.g. by arranging the interfaces such that the distance between the interfaces is an odd multiple of a quarter of the wavelength for the radar wave which should be reduced, wherein the wavelength refers to the wavelength within the material. The two reflections may cancel out completely if their phases are exactly opposite and their amplitudes are the same. However, it may be sufficient with partial cancellation which may be achieved when the amplitudes are different and/or when the phases are not completely opposite.

If a single layer is used it may be hard to optimize the radar attenuating properties while still achieving a thin and light coating. By introducing a particulate filler with radar absorbing properties to the polymer matrix of a single layer the coating may absorb radar waves. The more particulate filler is introduced the higher the absorption. However, at the same time the weight may increase, the reflectivity of the air to layer interface may change, and the radar wave path length may change, e.g. as an effect of a changing refractive index. With more than one layer it may be easier to decouple these effects and provide a thin, light coating with good radar attenuating properties.

According to the inventive concept the second layer may contain less than 10% of the amount of the particulate filler used in the first layer. The second layer may also contain no particulate filler. Such layers may be particularly suitable for providing thin and/or light tiles.

Another advantage of the first aspect of the inventive concept may be that thermoplastic polyurethane (TPU) is particularly suitable to use as a polymer matrix in at least one of the layers of the tile. It should be understood that the term thermoplastic may refer to a plastic which becomes moldable above a certain temperature and solidifies when cooled. A thermoplastic elastomer may be particularly useful as it may be reshaped by heating. This means that the thermoplastic may be easily recycled. It may also mean that two sheets of thermoplastic may be attached to each other by plastic welding. For example, when two tiles with a thermoplastic outermost layer are attached side by side to the surface of a wind turbine blade the tiles may also be attached to each other by plastic welding. This may smoothen the seam and improve the aerodynamical properties, it may also improve the adhesive properties of the surface coating as it may prevent the wind from catching the edges of a tile and ripping it off, it may also prevent water from entering between the tiles and degrade the attachment to the underlying surface. A thermoplastic elastomer may also be produced by extrusion which may be a very cost-effective way of producing tiles. Out of the known thermoplastic elastomers TPU has very good elastic properties: TPU may be obtained in a large hardness range such that flexural modulus may be varied over a large range; TPU has a high tensile strength; and TPU is also very resistant to tear propagation. Furthermore, there are signs that when magnetic fillers are added to an elastomer it also changes the elastic properties of the elastomer and that TPU is an elastomer which is particularly insensitive to such changes [Journal of COMPOSITE MATERIALS, Vol. 21—September 1987, pp. 782]. It should be understood that the term thermoplastic polyurethane may refer to any polyurethane which is thermoplastic, e.g. Elastollan, Desmopan, Pelletane, Avalon or Laripur.

It should be understood that a particulate filler having radar absorbing properties may be a plurality of particles suitable for dispersing in a polymer matrix, wherein the particles are made of material that interact with the electric field of the radar wave or material that interact with the magnetic field of the radar wave or a combination thereof.

It should be understood that a particulate filler of material that interact with the electric field of the radar wave which is dispersed in the polymer matrix may be an electrically conducting material, a high dielectric-loss material, or a material which interact with the electric field through dielectric loss due to polarization-relaxation. The material which interact with the electric field of the radar wave may be e.g. carbon black, graphene, carbon nanotubes, a metal-organic framework, a conducting polymer etc. Examples of metal-organic frameworks are MIL-100, MIL-101, MIL-53, UiO-66, NU-1000, and HKUST-1. MIL-100(Fe) may be particularly useful.

It should be understood that a particulate filler of material that interact with the magnetic field of the radar wave which is dispersed in the polymer matrix may be a high magnetic-loss material. The material that interact with the magnetic field of the radar wave may be e.g. ferrite. The term ferrite is here considered to include magnetite. Magnetite may be a magnetic particle of particular interest.

It should be understood that the tile may comprise more than two layers. Further layers may make the tile more effective. It should also be understood that the second layer may contain either no particulate filler, less than 10% of the amount of the particulate filler in the first layer, or less than 50% of the amount of the particulate filler in the first layer. Smaller amounts of a radar absorbing particulate filler in the second layer may be particularly beneficial.

According to the inventive concept the laminate of layers may solely comprise the first and the second layer, the first layer forms the top surface of the flexible surface sheet and the second layer forms the bottom surface of the flexible surface sheet.

An advantage may be that a tile with two layers drastically improves the radar absorbing properties compared to a tile with a single layer. At the same time a two layer tile may be relatively easy to produce. When comparing the radar absorbing properties of a two layer tile to a one layer tile, wherein the two tiles have the same total thickness, the two layer tile may have better radar absorbing properties than the one layer tile.

If an extrusion production method is used, e.g. co-extrusion, the complexity of the extrusion equipment, layer flow control, and layer flow calculations may increase with an increasing number of layers as the thicknesses and quality of the individual layers in the end-product may depend on production parameters, such as e.g. flow rate, of all the layers.

The inventors have found that when the second layer is adhesively attached to a surface such a tile may effectively reduce an S-band radar wave reflection from the surface.

According to the inventive concept the laminate of layers may further comprise:

a third layer comprising a polymer matrix into which a particulate filler is dispersed, wherein the particulate filler has radar absorbing properties, wherein the third layer adjoins the second layer on a side opposite to the first layer, such that the second layer is sandwiched between the first and the third layer.

An advantage may be that a tile comprising three layers may reduce a radar wave reflection even more effectively. The tiles may thereby reduce the radar wave reflection better. Alternatively or additionally, thinner and/or lighter tiles may be produced. For example, an especially useful tile may be a tile wherein an impinging radar wave firstly passes the first layer with a radar absorbing particulate filler, secondly passes the second layer wherein the second layer e.g. contains less than 10% of the amount of the particulate filler or contains no particulate filler, and thirdly passes the third layer with a radar absorbing particulate filler. Such a tile may e.g. be adhesively attached to a surface such that the third layer is in contact with the surface, alternatively the tile may comprise further layers after the third layer. An impinging radar wave may cause reflections from the air to tile interface, the layer to layer interfaces and from the tile to surface interface. By adjusting the thicknesses of the layers the phase difference between different reflections may be set to give an advantageous destructive interference. The second layer, may herein e.g. create two interfaces, to the first and third layer, which creates two reflections which may contribute to the destructive interference. The thickness of the second layer may also be set such that it defines the phase differences between reflections originating from above and below the second layer. By adjusting the amount of the radar absorbing particulate filler in the different layers the amount of absorption in each layer may be defined such that the amplitude of the different reflections is set such that the combined set of reflections cancel each other in an effective manner.

The inventors have found that when the third layer is adhesively attached to a surface such a tile may effectively reduce an X-band radar wave reflection from the surface. X-band radars may be particularly common at airports.

It should be understood that the tile may comprise more than three layers. Further layers between the third layer and the surface may make the tile more effective. It should also be understood that the second layer may contain either no particulate filler, less than 10% of the amount of the particulate filler in either of the first and third layer, or less than 50% of the amount of the particulate filler in either of the first and third layer. Smaller amounts of a radar absorbing particulate filler in the second layer may be particularly beneficial.

According to the inventive concept a configuration of the tile may be provided, wherein both the top surface and the bottom surface are adapted to be adhesively attachable to the surface, and wherein the flexible surface sheet is adapted such that in case the bottom surface is adhesively attached to the surface an S-band radar reflection of the surface is reduced, and in case the top surface is adhesively attached to the surface an X-band radar reflection of the surface is reduced, the S-band radar reflection having a frequency between 2 GHz and 4 GHz, the X-band radar reflection having a frequency between 8 GHz and 12 GHz.

An advantage may be that a reversible tile is formed such that the same tile may be used both at airports using S-band radars and airports using X-band radars. This may reduce costs for the manufacturer and/or the company installing the tiles. These parties may e.g. not need to keep two types of tiles in stock, one type may be enough.

According to the inventive concept a configuration of the tile may be provided,
wherein both the top surface and the bottom surface are adapted to be adhesively attachable to the surface, and
wherein the flexible surface sheet is adapted such that in case the bottom surface is adhesively attached to the surface an S-band radar reflection of the surface is reduced, and in case the top surface is adhesively attached to the surface a C-band radar reflection of the surface is reduced, the S-band radar reflection having a frequency between 2 GHz and 4 GHz, the C-band radar reflection having a frequency between 4 GHz and 8 GHz.

An advantage may be that a reversible tile is formed such that the same tile may be used both at airports using S-band radars and airports using C-band radars. This may reduce costs for the manufacturer and/or the company installing the tiles. These parties may e.g. not need to keep two types of tiles in stock, one type may be enough.

According to the inventive concept a first layer thickness may be between 70% and 130% of a second layer thickness, wherein the first layer thickness is the thickness of the first layer and the second layer thickness is the thickness of the second layer.

The inventors have found that a thickness ratio between the first and second layer of roughly 1:1 is particularly beneficial. The inventors have found that it may be advantageous if the second layer contains less than 10% of the amount of the particulate filler in the first layer or contains no particulate filler.

The inventors have found that when the second layer is adhesively attached to a surface such a tile may effectively reduce an S-band radar wave reflection from the surface.

The inventors have found that when the first layer is adhesively attached to a surface such a tile may effectively reduce an X-band radar wave reflection from the surface.

According to the inventive concept the first layer thickness may also be between 85% and 115% of the second layer thickness, wherein the first layer thickness is the thickness of the first layer and the second layer thickness is the thickness of the second layer.

According to the inventive concept the particulate filler may comprise particles of a metal-organic framework.

A metal-organic framework may be a compound consisting of metal ions or clusters coordinated to organic ligands to form one-, two-, or three-dimensional structures. Examples of metal-organic frameworks are MIL-100, MIL-101, MIL-53, UiO-66, NU-1000, and HKUST-1. MIL-100 (Fe) may be particularly useful.

The inventors have realized that such particulate fillers may be particularly effective in absorbing the radar wave. Metal-organic framework particles may be easily dispersed in a polymer matrix.

According to the inventive concept the particulate filler may comprise both particles that interact with an electric field of the radar wave and particles that interact with a magnetic field of the radar wave.

The inventors have realized that such particulate fillers may be particularly effective in absorbing the radar wave.

According to the inventive concept the particulate filler may comprise aggregate particles, said aggregate particles comprising both material that interact with the electric field of the radar wave and material that interact with the magnetic field of the radar wave.

The inventors have realized that aggregate particles may be particularly effective in absorbing the radar wave although the reason is not completely understood at this point. It may be that in an aggregate particle a unit of material that interact with the electric field may be placed very close to a unit of material that interact with the magnetic field such that they cooperate to enhance the absorption. It may also be that the material that interact with the electric field and the material that interact with the magnetic field is arranged such that the aggregate particle simultaneously support both electric and magnetic resonances. It may also be that the material that interact with the electric field may encapsulate the material that interact with the magnetic field and thereby protect it.

According to the inventive concept the aggregate particles may comprise core/shell particles, the core/shell particles having either:
a ferrite core and at least a partial shell of a metal-organic framework, or
a metal-organic framework core and at least a partial shell of ferrite.

Such particles may form a core that interacts with the magnetic field of the radar wave and a shell that interacts with the electric field of the radar wave or a core that interacts with the electric field of the radar wave and a shell that interacts with the magnetic field of the radar wave. The inventors have found that such particles may be particularly efficient radar wave absorbers when embedded in a polymer matrix. The reason is not entirely understood at this point. It may e.g. be that the spherical symmetry effectively supports both electric and magnetic resonances. An advantage of having a metal-organic framework partial, or full, shell may be that such particles are easily dispersed in a polymer matrix.

According to the inventive concept the aggregate particles may comprise ferrite-decorated graphene flakes.

Such particles may form an electrically conductive layer from the graphene. The ferrite may additionally form a magnetic layer or partial layer in parallel with the electrically conductive layer. The inventors have found that such particles may be particularly efficient radar wave absorbers when embedded in a polymer matrix. The reason is not entirely understood at this point. It may e.g. be that the planar symmetry effectively supports both electric and magnetic resonances. It may also be that interfacial coupling between the graphene and the magnetite leads to enhanced dielectric loss and a balance between magnetic and dielectric loss which is optimal for radar wave absorption. It may also be that the embedding of magnetite particles on graphene/multi-layered graphene nanoplatelets can prevent aggregation of the nanoparticles when using these as solid powders.

It should be understood that graphene herein refers to single layer graphene as well as multilayer graphene with up to 10 layers.

According to the inventive concept the aggregate particles may comprise core/shell particles, the core/shell particles having a ferrite core and at least a partial shell of a conductive polymer.

Such particles may form a magnetic core with an electrically conducting shell. The inventors have found that such particles may be particularly efficient radar wave absorbers when embedded in a polymer matrix. The reason is not entirely understood at this point. It may e.g. be that the spherical symmetry effectively supports both electric and magnetic resonances. An advantage of having a conductive polymer partial, or full, shell may be that such particles are easily dispersed in a polymer matrix. Such particles may form a polymer to polymer interface between the conductive polymer and the polymer matrix. This may facilitate dispersion so that the ferrite particles may become more dispersed than they would be if they had not had a conductive polymer shell. The conductive polymer shell may also protect the ferrite core which may slow down aging. Such particles may also have a higher dielectric loss due to synergistic effects between the core and the shell.

It should be understood that there may be multiple ferrite cores encased in the same conductive polymer shell. It should also be understood that the term conductive polymer may refer to a polymer that conduct electricity.

According to the inventive concept the thermoplastic polyurethane layer of the tile may be produced by extrusion.

An advantage may be that high production rates can be achieved with the extrusion production method. Another advantage may be the low cost of the extrusion production method. Furthermore, the thermoplastic polyurethane layer produced by extrusion may in principle be made arbitrarily long. In comparison, polymer layers produced by e.g. molding may have a finite length set by the length of the mold. Long tiles may thus be produced e.g. by combining several layers made by extrusion into a laminate of layers. Alternatively, one long layer made by extrusion may be combined with shorter layers made by other production methods. The shorter layers may be adhesively attached to the long layer side by side such that they together also form a long layer. Since at least one layer, the layer produced by extrusion, is continuous, long tiles may be produced. Long tiles may then be converted to shorter tiles by cutting. The long tiles may be cut at the production facility or at the site where the tiles are being adhesively attached to a structure. Tiles can thus be cut to custom lengths or shapes.

According to the inventive concept the polymer matrix of all the laminate layers may be thermoplastic polyurethane.

An advantage may be that recycling is facilitated. For example, the entire tile may be melted down and used in other products which also require thermoplastic polyurethane. Another advantage may be that plastic welding is further facilitated when all the laminate layers are made of a thermoplastic material. Another advantage may be that when the same polymer is used in all the laminate layers the melt viscosities of the individual layers are similar which may make it easier to produce the laminate layers by co-extrusion.

According to the inventive concept at least two adjoining layers of the laminate layers may be produced by co-extrusion.

An advantage may be that high production rates can be achieved with the extrusion production method. Another advantage may be the low cost of the extrusion production method. Another advantage may be that the interface between the two adjoining layers produced by co-extrusion is more well defined in comparison to other production methods. For example, when two layers are produced separately and then adhesively attached to each other air pockets may be formed between the layers, creases may form, and the amount of adhesive between the layers may vary over the interface, all of which may contribute to an ill-defined interface which may degrade the properties of the tile in terms of reducing a radar wave reflection. Many of these drawbacks may be alleviated with a co-extrusion production method.

According to the inventive concept the tile may be adapted to be attached to a tower or a blade of a wind turbine.

An advantage may be that wind turbines may be built closer to e.g. airports where radars are frequently used. The airport surrounding is often suitable for wind turbines, e.g. because it is sparsely populated. However, as the wind turbines may interfere with the airport radar systems wind turbines may not be allowed within a certain distance of the airport. When the wind turbines are clad with tiles according to the inventive concept this distance may be reduced.

According to an example of the first aspect there is provided:

a tile for reducing a radar wave reflection from a surface, the tile being a flexible surface sheet which is adhesively attachable to the surface, wherein the flexible surface sheet reduces the radar wave reflection from the surface at a frequency, the frequency being a frequency between 1 GHz and 12 GHz; and, wherein the flexible surface sheet is a laminate of layers, wherein the laminate of layers comprises:

a first layer comprising a polymer matrix into which a particulate filler is dispersed, wherein the particulate filler has radar absorbing properties; and a second layer comprising a polymer matrix, the second layer adjoining the first layer;

wherein the first and second layer define the radar wave reducing properties of the laminate of layers, wherein the first layer is located closer to the top surface of the flexible surface sheet than the second layer and the second layer is located closer to the bottom surface of the flexible surface sheet than the first layer;

wherein both the top surface and the bottom surface are adapted to be adhesively attachable to the surface, and wherein the flexible surface sheet is adapted such that in case the bottom surface is adhesively attached to the surface an S-band radar reflection of the surface is reduced, and in case the top surface is adhesively attached to the surface an X-band radar reflection of the surface is reduced, the S-band radar reflection having a frequency between 2 GHz and 4 GHz, the X-band radar reflection having a frequency between 8 GHz and 12 GHz.

According to the example neither of the first and second layer need, necessarily, be made of thermoplastic polyurethane. Furthermore, the first and second layer may define the radar wave reducing properties of the laminate of layers without being the sole layers of the laminate of layers. For example, the first and second layer may have one or more surface layers, either forming the top or bottom surface. The surface layers may e.g. be thin in comparison to the first and second layer. The surface layers may e.g. have a small impact on the radar wave reducing properties in comparison to the first and second layer.

The radar waves reflections may also be reduced by a tile for reducing a radar wave reflection from a surface, the tile being a flexible surface sheet which may be adhesively attachable to the surface, wherein the flexible surface sheet reduces the radar wave reflection from the surface at a frequency, the frequency being a frequency between 1 GHz and 12 GHz; and, wherein the flexible surface sheet is a laminate of layers, wherein at least one of a top surface and a bottom surface of the flexible surface sheet can be adapted to be adhesively attachable to the surface, and wherein the laminate of layers comprises:
  a first layer comprising a polymer matrix into which a particulate filler is dispersed, wherein the particulate filler has radar absorbing properties; and
  a second layer comprising a polymer matrix, the second layer adjoining the first layer;
  wherein the first and second layer define the radar wave reducing properties of the laminate of layers,
  wherein the first layer may be located closer to the top surface of the flexible surface sheet than the second layer and the second layer may be located closer to the bottom surface of the flexible surface sheet than the first layer; and
  wherein the flexible surface sheet is adapted such that when it is adhesively attached to the surface an S-band radar reflection of the surface as well as an X-band radar reflection of the surface is reduced, the S-band radar reflection having a frequency between 2 GHz and 4 GHz, the X-band radar reflection having a frequency between 8 GHz and 12 GHz.

Thus, the tile may be designed for giving a reduced radar reflection in two bands simultaneously, e.g. in the S-band and the X-band as in the example above. However, it should be understood that the tile may also be designed to give a reduced radar reflection in two other bands simultaneously, e.g. in the L-band and the X-band. The tile may e.g. give a reduced radar reflection from the surface in two bands simultaneously when the top surface of the flexible surface sheet is attached to the surface.

According to a second aspect of the invention, there is provided a method for producing a tile for reducing a radar wave reflection from a surface, the tile being a flexible surface sheet which is adhesively attachable to a surface,
  wherein the flexible surface sheet adhesively attached to the surface reduces a radar wave reflection of the surface at a frequency, the frequency being a frequency between 1 GHz and 12 GHz; and,
  wherein the flexible surface sheet is a laminate of layers, the layers being arranged after each other in between a top surface and a bottom surface of the flexible surface sheet, wherein the laminate of layers comprises:
  a first layer comprising a polymer matrix of thermoplastic polyurethane into which a particulate filler is dispersed, wherein the particulate filler has radar absorbing properties;
  a second layer comprising a polymer matrix of thermoplastic polyurethane, the second layer adjoining the first layer, the method comprising:
  feeding thermoplastic polyurethane and the particulate filler into a first extruder, wherein the thermoplastic polyurethane is melted and mixed with the particulate filler in the first extruder;
  feeding thermoplastic polyurethane into a second extruder, wherein the thermoplastic polyurethane is melted and mixed in the second extruder;
  extracting a first flat planar flow from the first extruder, the first flat planar flow comprising melted thermoplastic polyurethane mixed with the particulate filler and having the form of a thin viscous layer;
  extracting a second flat planar flow from the second extruder, the second flat planar flow comprising melted thermoplastic polyurethane and having the form of a thin viscous layer;
  combining the viscous layers of the first and the second flat planar flow into a viscous laminate layer;
  cooling the viscous laminate layer into a solid laminate layer.

Such a method may be seen as a co-extrusion production method. An advantage may be that high production rates can be achieved with the co-extrusion production method. Another advantage may be the low cost of the co-extrusion production method. Another advantage may be that the interface between the two adjoining layers produced by co-extrusion is more well defined in comparison to other production methods. For example, when two layers are produced separately and then adhesively attached to each other air pockets may be formed between the layers, creases may form, and the amount of adhesive between the layers may vary over the interface, all of which may contribute to an ill-defined interface which may degrade the properties of the tile in terms of reducing a radar wave reflection. Many of these drawbacks may be alleviated with a co-extrusion production method.

According to the second aspect of the invention the particulate filler may comprise either:
  both particles that interact with the electric field of the radar wave and particles that interact with the magnetic field of the radar wave; or
  aggregate particles, said aggregate particles comprising both material that interact with the electric field of the radar wave and material that interact with the magnetic field of the radar wave.

An advantage may be that such particulate fillers may be particularly effective in absorbing the radar wave.

According to the second aspect of the invention the first flat planar flow and the second flat planar flow may be adapted to result in a first layer thickness between 70% and 130% of a second layer thickness, wherein the first layer thickness is the thickness of the first layer and the second layer thickness is the thickness of the second layer.

An advantage may be that the method may be used to produce a tile which, when the second layer is adhesively attached to a surface, may effectively reduce an S-band radar wave reflection from the surface.

An advantage may be that the method may be used to produce a tile which, when the first layer is adhesively attached to a surface, may effectively reduce an X-band radar wave reflection from the surface.

It should be understood that in all the embodiments according to the second aspect of the invention the second layer may contain either no particulate filler, less than 10% of the amount of the particulate filler in the first layer, or less than 50% of the amount of the particulate filler in the first layer. Smaller amounts of a radar absorbing particulate filler in the second layer may be particularly beneficial.

According to a third aspect of the invention, there is provided a tile for reducing a radar wave reflection from a surface, the tile being a flexible surface sheet which is adhesively attachable to the surface,
  wherein the flexible surface sheet reduces the radar wave reflection from the surface at a frequency, the frequency being a frequency between 1 GHz and 12 GHz; and,
  wherein the flexible surface sheet is a laminate of layers, wherein at least one of a top surface and a bottom surface of the flexible surface sheet is adapted to be adhesively attachable to the surface, and
  wherein the laminate of layers comprises:
  a first layer comprising a polymer matrix into which a particulate filler is dispersed, wherein the particulate filler has radar absorbing properties; and,
  a second layer comprising a polymer matrix, the second layer adjoining the first layer,
  wherein the polymer matrix of at least one of the first and the second layer is a thermoplastic polymer.

According to a fourth aspect of the invention, there is provided a tile for reducing a radar wave reflection from a surface, the tile being a flexible surface sheet which is adhesively attachable to the surface, wherein the flexible surface sheet reduces the radar wave reflection from the surface at a frequency, the frequency being a frequency between 1 GHz and 12 GHz; and,
   wherein the flexible surface sheet is a laminate of layers, wherein at least one of a top surface and a bottom surface of the flexible surface sheet is adapted to be adhesively attachable to the surface, and
   wherein the laminate of layers comprises:
   a first layer comprising a polymer matrix into which a particulate filler is dispersed, wherein the particulate filler has radar absorbing properties; and,
   a second layer comprising a polymer matrix, the second layer adjoining the first layer,
   wherein the polymer matrix of at least one of the first and the second layer is an elastomer.

Tiles according to the third and fourth aspect of the invention may have the same advantages, or similar advantages, as the tiles encompassed by the claims in this application and may possibly be the subject of a future divisional application.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

In the following tiles 10 adhesively attached to wind turbines 60 are used by way of example. However, it should be understood that the tiles 10 may be adhesively attached to other structures as well, e.g. buildings, overhead power line structures etc.

Figure 1:
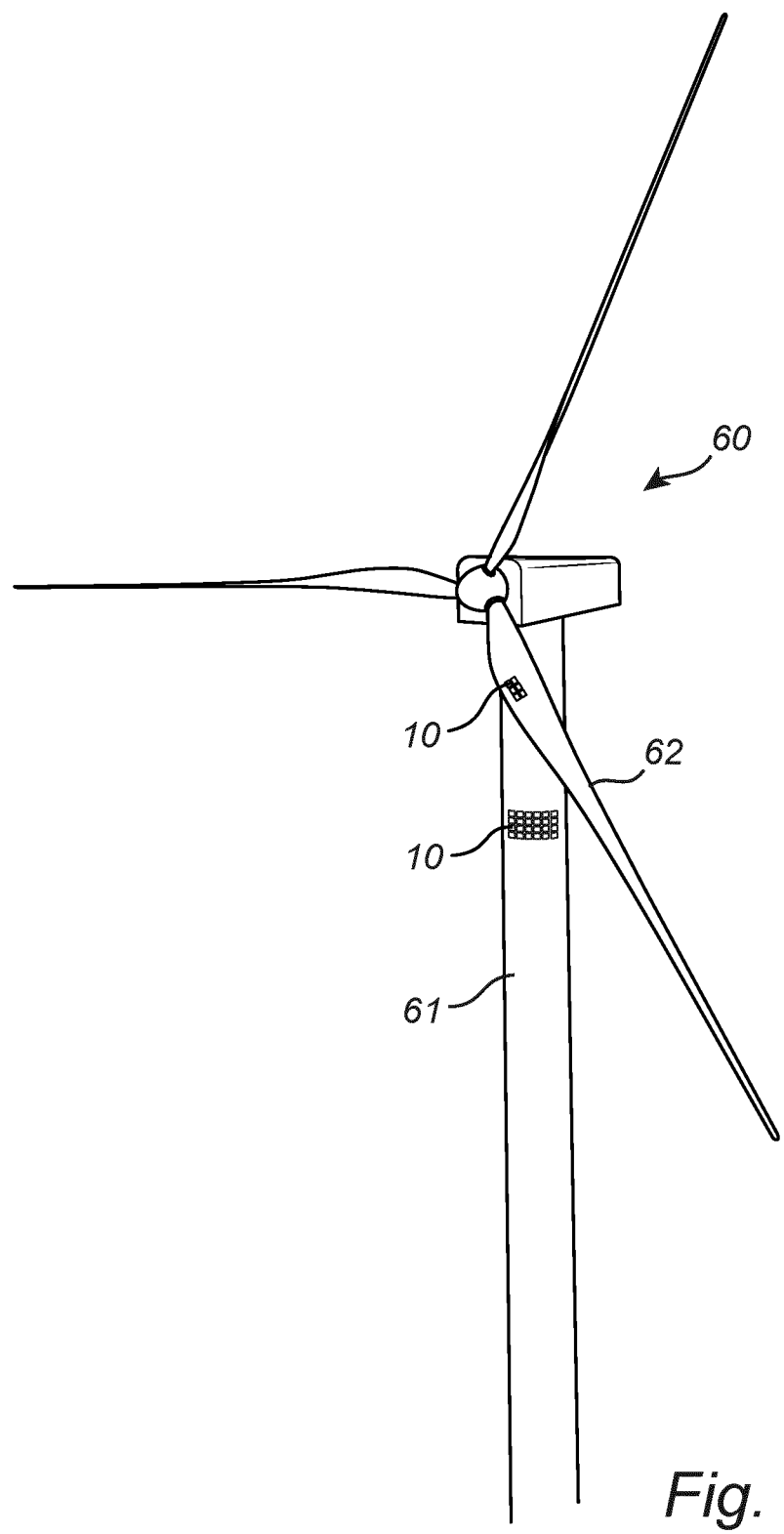
FIG. 1 illustrates a perspective view of a wind turbine
Figure 2:
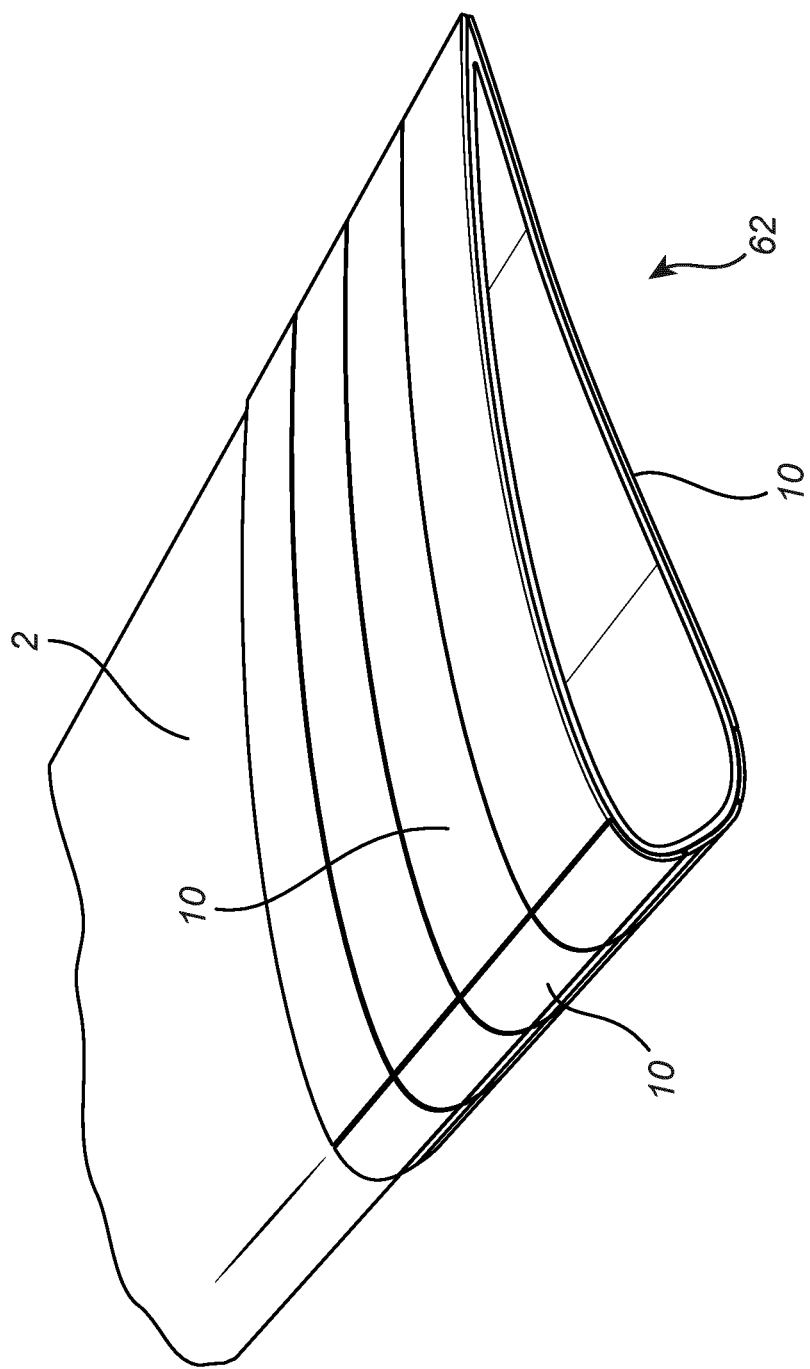
FIG. 2 illustrates a perspective view of a cross-section of a wind turbine blade
Figure 3:
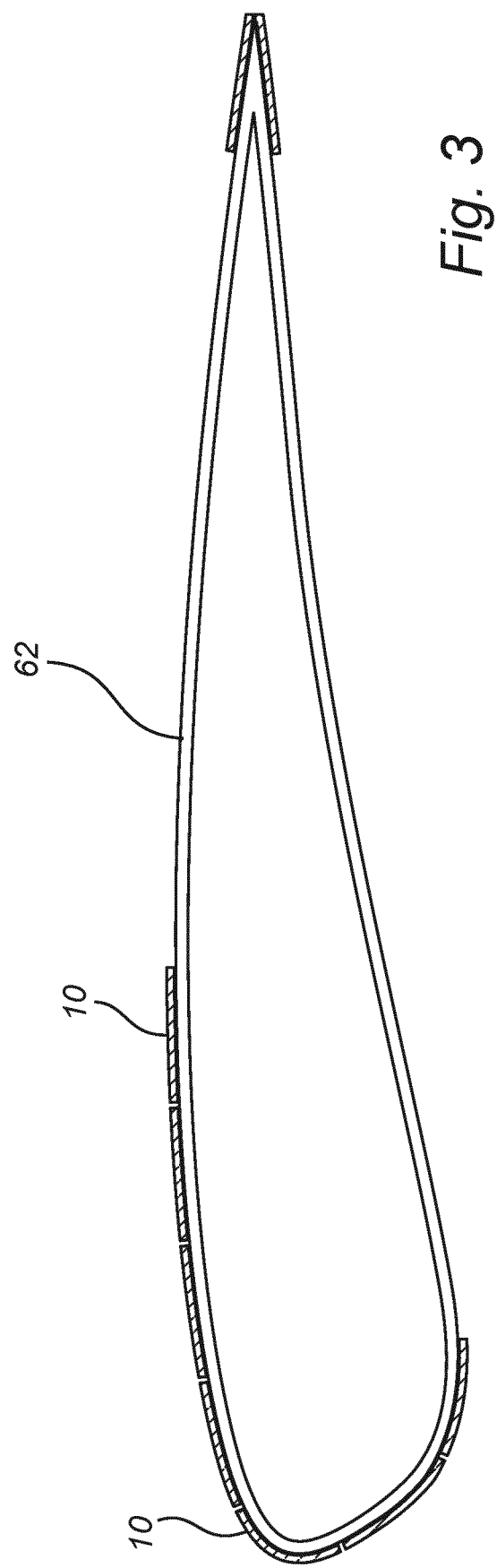
FIG. 3 illustrates a cross-section of a wind turbine blade

FIG. 1 illustrates tiles 10 which are adhesively attached to the tower 61 and a blade 62 of a wind turbine 60. FIG. 3 illustrates a cross-section of a blade 62 of a wind turbine 60 with tiles 10 attached. The tiles are flexible, so that they conform to the surface as illustrated in FIG. 3. In one embodiment, the tiles 10 are provided in different sizes such that they may be quickly attached to a structure while still conforming well to the surface. FIG. 2 illustrates a perspective view of a cross-section of a blade 62 which is partially covered with tiles 10 of different sizes. As illustrated in FIG. 3 long tiles 10 may be used in regions where the surface curvature is large, i.e. relatively flat regions. Smaller tiles 10 may be used in regions where the surface curvature is slightly smaller. The tiles 10 may be arranged such that the joint between two tiles 10 lies in a region where the surface curvature is the smallest, i.e. wherein it may be the hardest to attach a surface coating such that it conforms to the surface. The tiles 10 may be attached only to the underlying surface 2. The tiles 10 may also be attached to each other. For example, the joints between the tiles 10 may be filled with adhesive or the tiles 10 may be connected by e.g. plastic welding after the tiles 10 have been adhesively attached to the surface 2.

Figure 4:
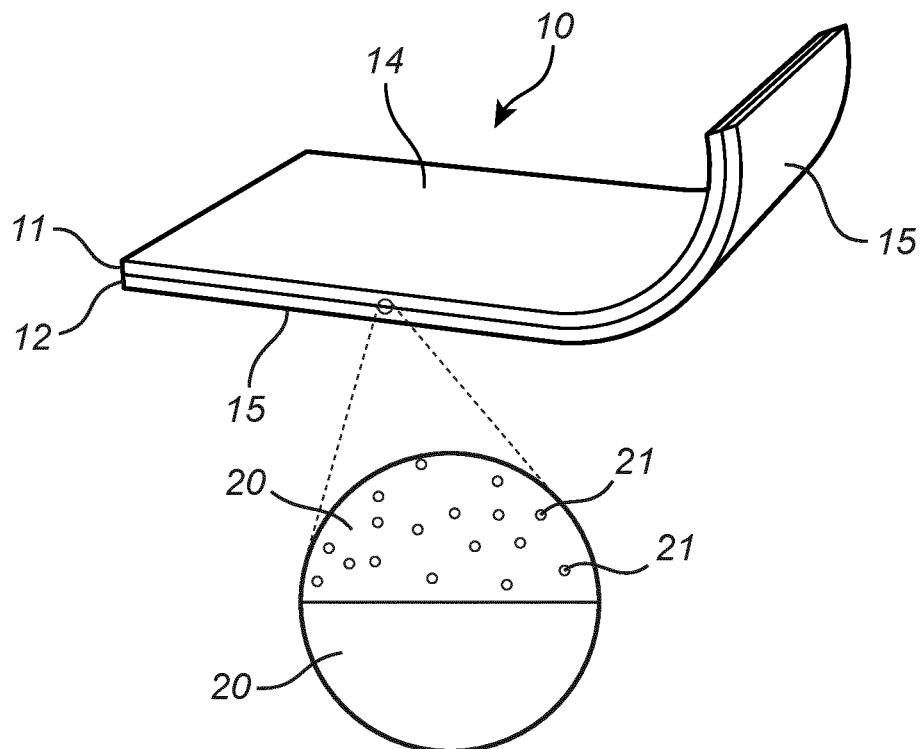
FIG. 4 illustrates a tile

FIG. 4 illustrates a tile 10 wherein a first layer 11 and a second layer 12 combines to a laminate of layers to form a flexible surface sheet, the tile having a top surface 14 and a bottom surface 15. The inset of FIG. 4 illustrates a close-up view of the interface between the first layer 11 and the second layer 12. The close-up illustrates the first 11 and second 12 layer comprising a polymer matrix 20 and a particulate filler 21 with radar absorbing properties being dispersed in the polymer matrix 20 of the first layer 11. The particulate filler may e.g. have particle sizes up to 50 μm. The particulate filler material may e.g. be carbon black, graphene, single walled carbon nanotubes, multi walled carbon nanotubes, $MoS_2$, $NbSe_2$, $NbS_2$, a metal-organic framework, a conducting polymer, ferrite, or combinations thereof.

Figure 5:
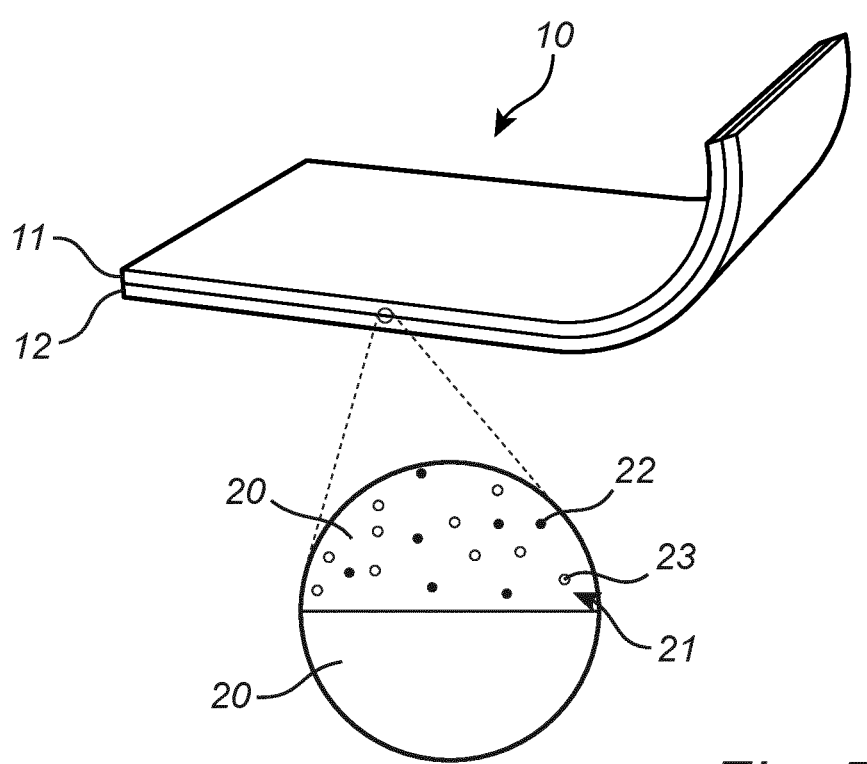
FIG. 5 illustrates a tile

FIG. 5 illustrates a tile 10 wherein the particulate filler 21 with radar absorbing properties in the first layer 11 comprises particles 22 that interact with an electric field of the radar wave and particles 23 that interact with a magnetic field of the radar wave. The particles 22 that interact with an electric field may e.g. be particles of carbon black, graphene, single-walled carbon nanotubes, multi-walled carbon nanotubes, $MoS_2$, $NbSe_2$, $NbS_2$, a metal-organic framework, or a conducting polymer. The particles 23 that interact with a magnetic field may e.g. be ferrite particles.

Figure 6:
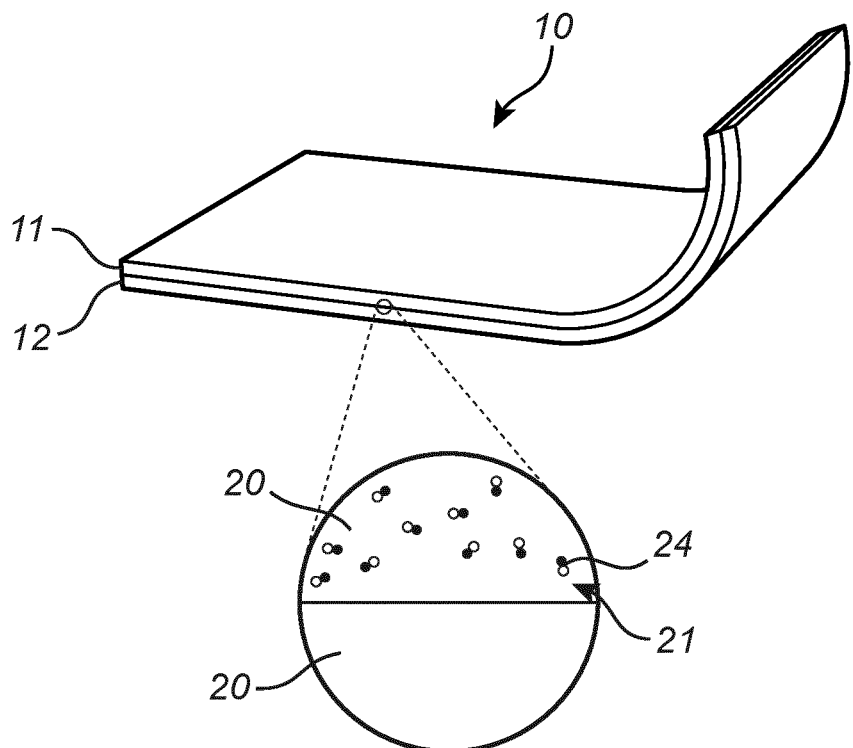
FIG. 6 illustrates a tile

FIG. 6 illustrates a tile 10 wherein the particulate filler 21 with radar absorbing properties in the first layer 11 comprises aggregate particles 24 which comprise both material 25 that interact with the electric field of the radar wave and material 26 that interact with the magnetic field of the radar wave.

Figure 7:
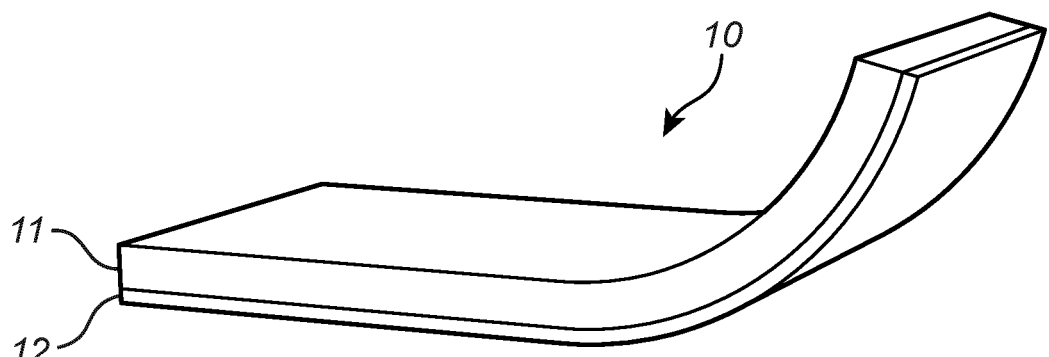
FIG. 7 illustrates a tile

In any of the embodiments illustrated in FIG. 4-6 the first 11 and the second 12 layer may have a thickness ratio of approximately 1:1. For example, the first layer thickness may be between 70% and 130% of the second layer thickness, or between 85% and 115% of the second layer thickness. However, the thickness ratio between the first 11 and the second 12 layer may also be another, as illustrated in FIG. 7, depending on the application. The thickness of the different layers and the total thickness may be adjusted such that the central frequency of the absorption spectrum of the tile may be set to a desired value, e.g. in the middle of the S-band or in the middle of the X-band.

Figure 8:
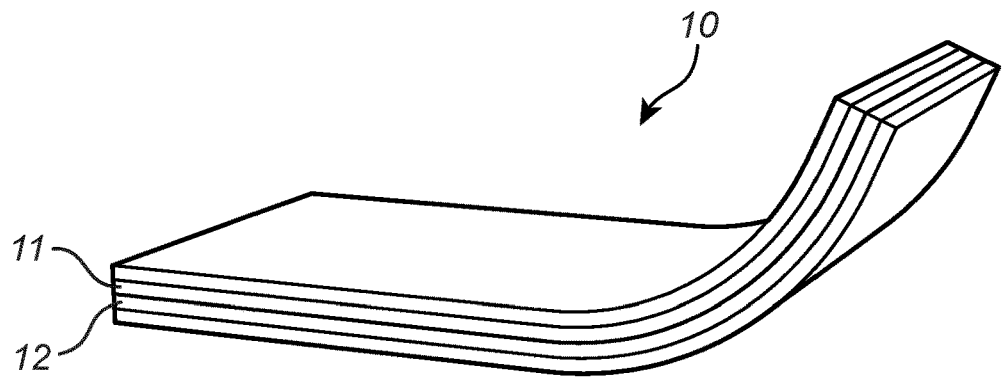
FIG. 8 illustrates a tile

FIG. 8 illustrates a tile 10 wherein the tile 10 in addition to the first 11 and second 12 layer comprises further layers. The further layers comprise a polymer matrix 20 and may or may not comprise one or more particulate filler 21.

Figure 9:
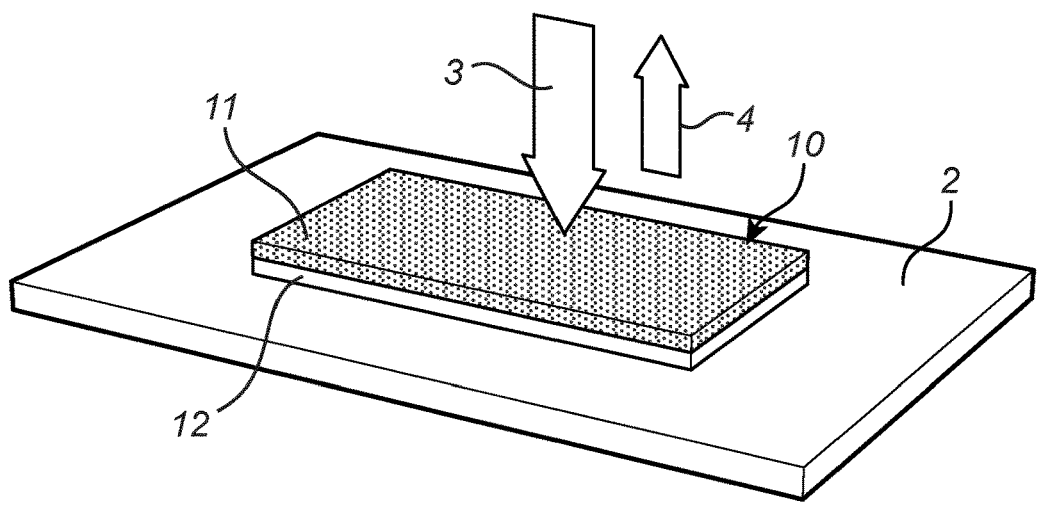
FIG. 9 illustrates a tile attached to a surface
Figure 10:
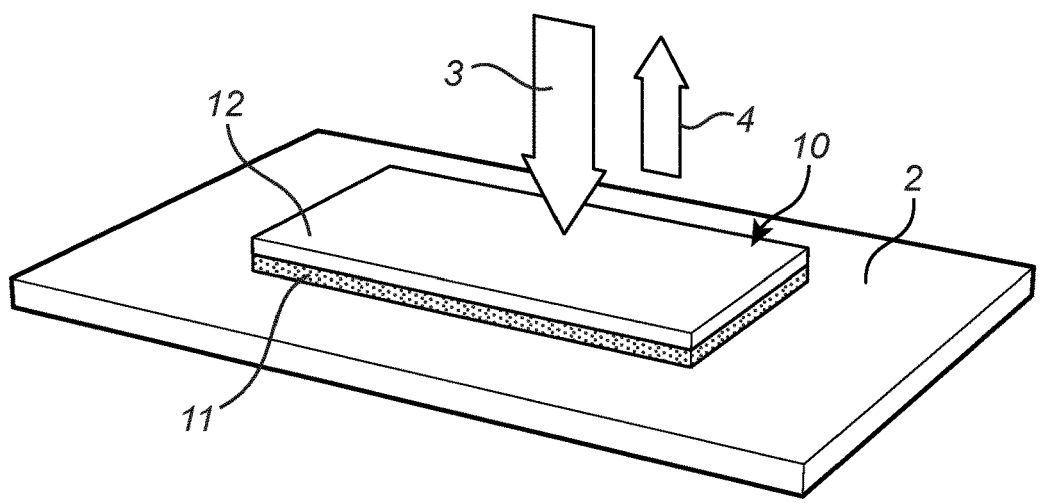
FIG. 10 illustrates a tile attached to a surface

FIG. 9 illustrates a tile 10 wherein the second layer 12 is adhesively attached to a surface 2 while FIG. 10 illustrates a tile 10 wherein the first layer 11 is adhesively attached to a surface 2. The figures further illustrate an incoming radar wave 3 and the radar wave reflection 4 from the surface 2 covered by the tile 10, wherein the reflection 4 is attenuated in comparison to the incoming radar wave 3. It should be understood that the attenuation may be different depending on which side of the tile 10 is attached to the surface 2. Thus, the radar absorption spectrum may depend on which side of the tile 10 is attached to the surface 2. When one side is attached to the surface 2 the absorption spectrum may have one central frequency and when the other side is attached to the surface 2 the absorption spectrum may have another central frequency. In one embodiment the tile 10 is adapted such that when a bottom surface 15 of the tile 10 is attached to a surface 2 the central frequency of the absorption spectrum lies in the S-band and when a top surface 14 of the tile 10 is attached to a surface 2 the central frequency of the absorption spectrum lies in the X-band. In one embodiment the tile 10 is adapted such that when a bottom surface 15 of the tile 10 is attached to a surface 2 the absorption spectrum implies a reduction of a reflected radar wave in the S-band and when a top surface 14 of the tile 10 is attached to a surface 2 the absorption spectrum implies a reduction of a reflected radar wave in the X-band.

Figure 11:
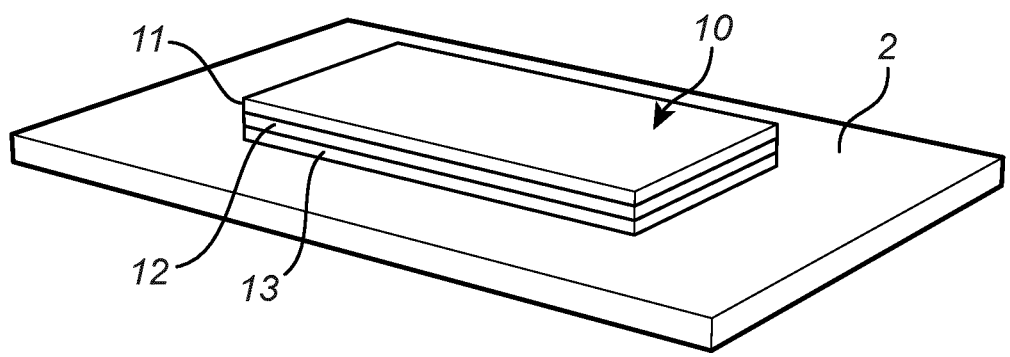
FIG. 11 illustrates a tile attached to a surface

FIG. 11 illustrates a tile 10 wherein a third layer 13, the third layer 13 comprising a polymer matrix 20 into which a particulate filler 21 is dispersed, adjoins the second layer 12 on a side opposite to the first layer 11. The third layer 13 of the tile 10 is adhesively attached to a surface 2.

Figure 12:
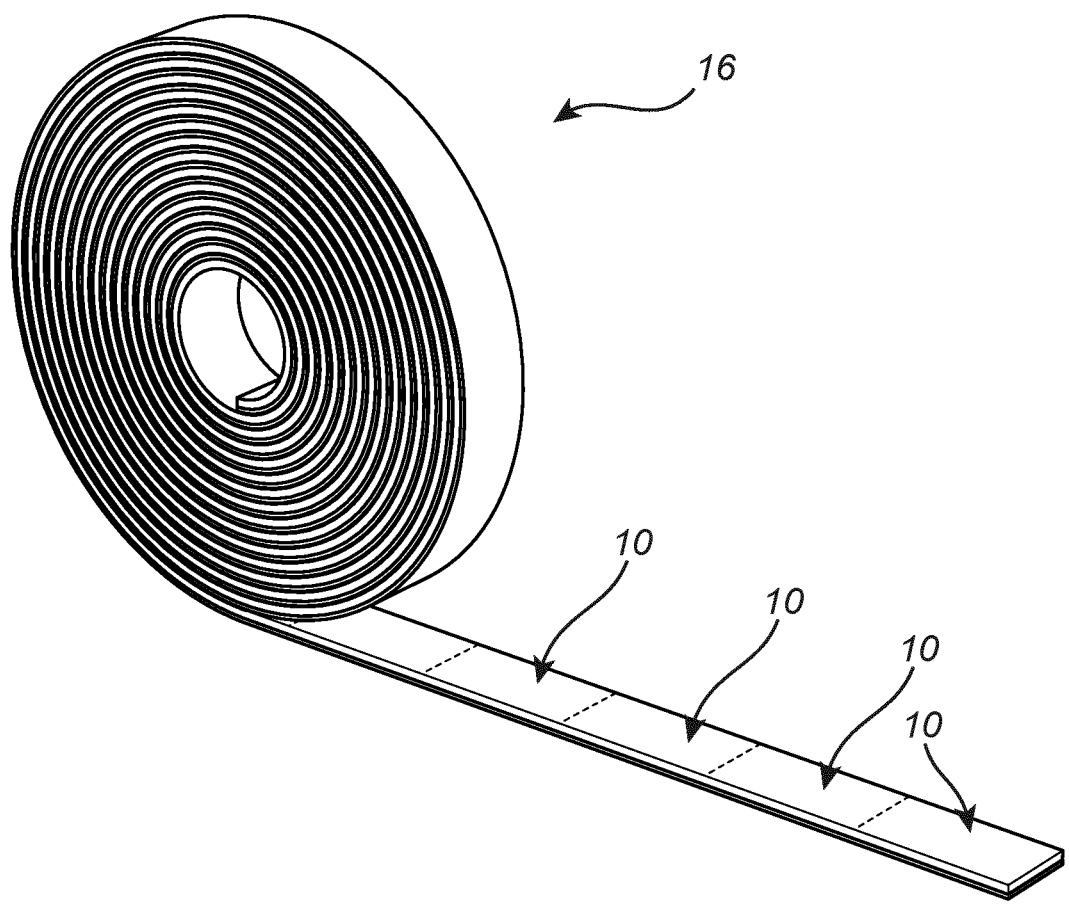
FIG. 12 illustrates a roll of a flexible surface

FIG. 12 illustrates a roll 16 of a flexible surface sheet according to the inventive concept, wherein the surface sheet may be cut into tiles 10. Such rolls 16 may be produced e.g. by extrusion. Rolls 16 may be transported to the structure onto which the tiles 10 should be attached. Tiles 10 may subsequently be cut on site. Such a way of providing tiles 10 may reduce waste as the tiles 10 may be cut to exactly the required length. It may also make the transport more efficient as one roll 16 may replace several boxes of tiles 10.

Figure 13:
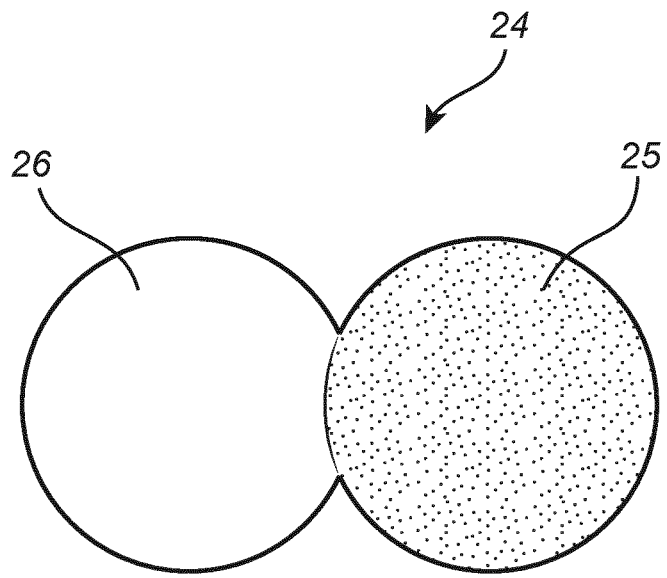
FIG. 13 illustrates an aggregate particle
Figure 14:
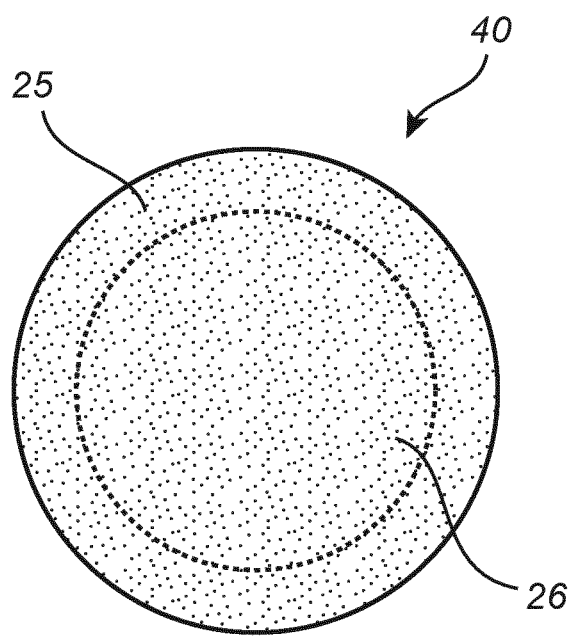
FIG. 14 illustrates an aggregate particle
Figure 15:
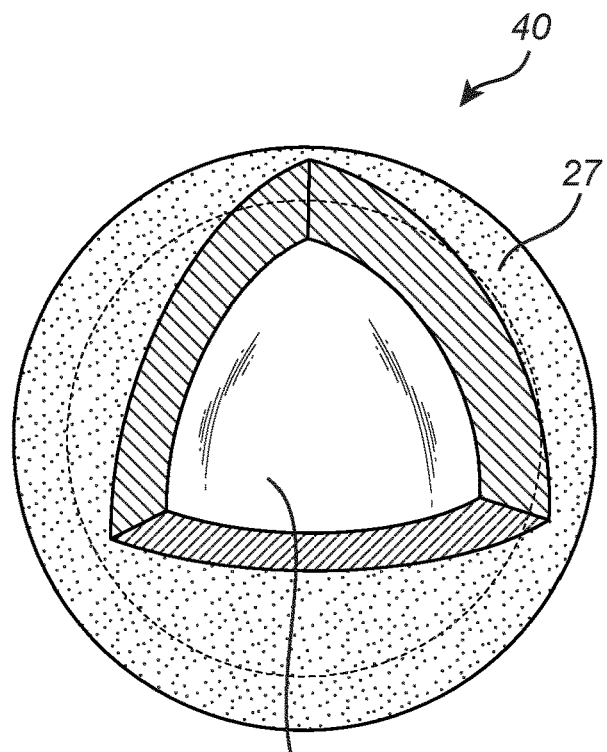
FIG. 15 illustrates an aggregate particle
Figure 16:
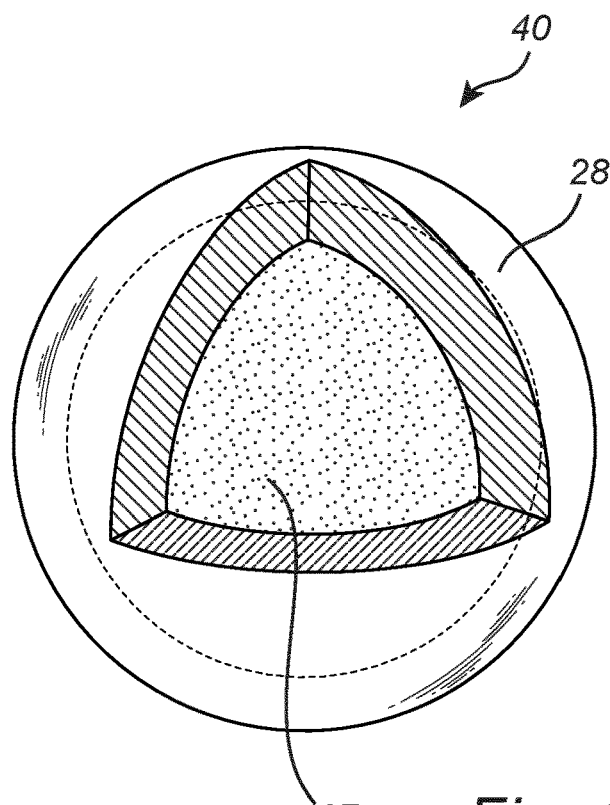
FIG. 16 illustrates an aggregate particle
Figure 17:
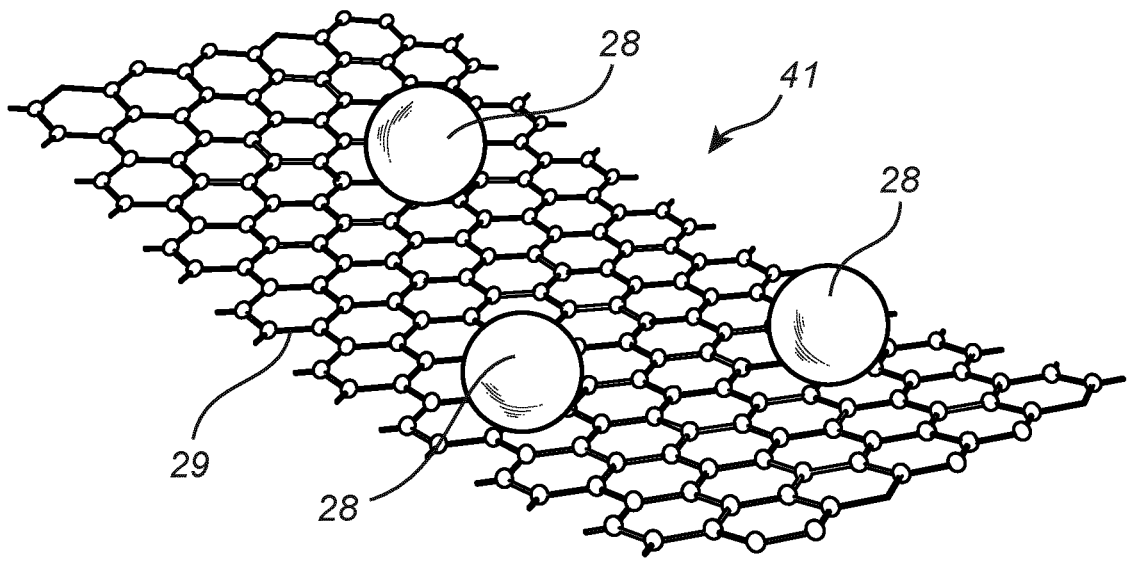
FIG. 17 illustrates an aggregate particle
Figure 18:
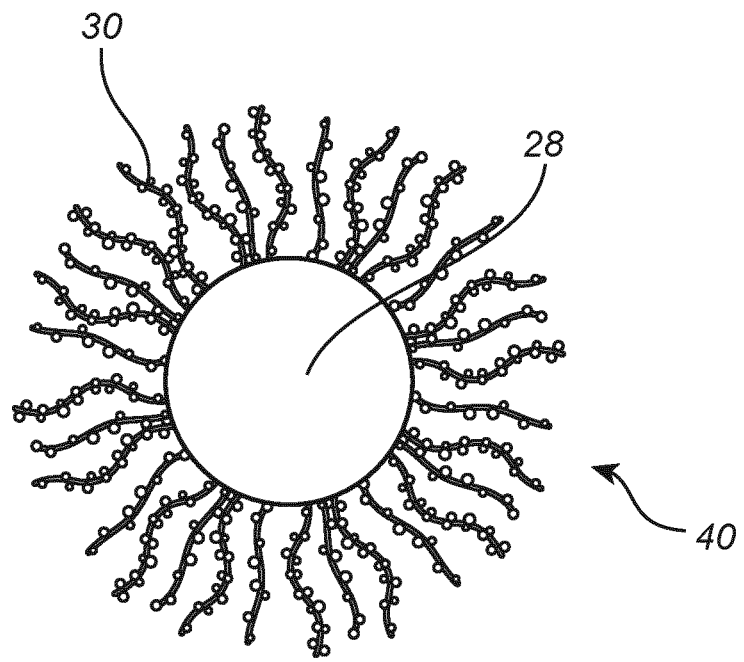
FIG. 18 illustrates an aggregate particle

According to the inventive concept the particulate filler 21 with radar absorbing properties may come in many different forms. In some embodiments the particulate filler 21 comprises aggregate particles 24. An example of an aggregate particle 24 is illustrated in FIG. 13 wherein the particle comprises one part of material 25 that interact with the electric field of the radar wave and one part of material 26 that interact with the magnetic field of the radar wave. Another example of an aggregate particle 24 is illustrated in FIG. 14 wherein the particle is a core/shell particle 40 with a core of material 26 that interact with the magnetic field of the radar wave and a shell of material 25 that interact with the electric field of the radar wave. In other embodiments the material choice for the core and the shell is reversed. FIG. 15 illustrates an aggregate particle 24 in the form of a core/shell particle 40 with a ferrite 28 core and a partial shell of a metal-organic framework 27, in other embodiments the shell may cover the core fully. FIG. 16 illustrates an aggregate particle 24 in the form of a core/shell particle 40 with a metal-organic framework 27 core and a partial shell of ferrite 28, in other embodiments the shell may cover the core fully. Examples of metal-organic frameworks are: MIL-100, MIL-101, MIL-53, UiO-66, NU-1000, HKUST-1. FIG. 17 illustrates an aggregate particle 24 in the form of a ferrite-decorated graphene flake 41, wherein ferrite 28 particles are attached to the graphene flake 29. FIG. 18 illustrates an aggregate particle 24 in the form of a core/shell particle 40 having a ferrite 28 core and a partial shell of a conductive polymer 30, in other embodiments the shell may cover the core fully. In other embodiments there may be several ferrite 28 cores embedded in the same conductive polymer 30 shell. Examples of conductive polymers are PEDOT, PANI, PPV and PPY.

Figure 19:
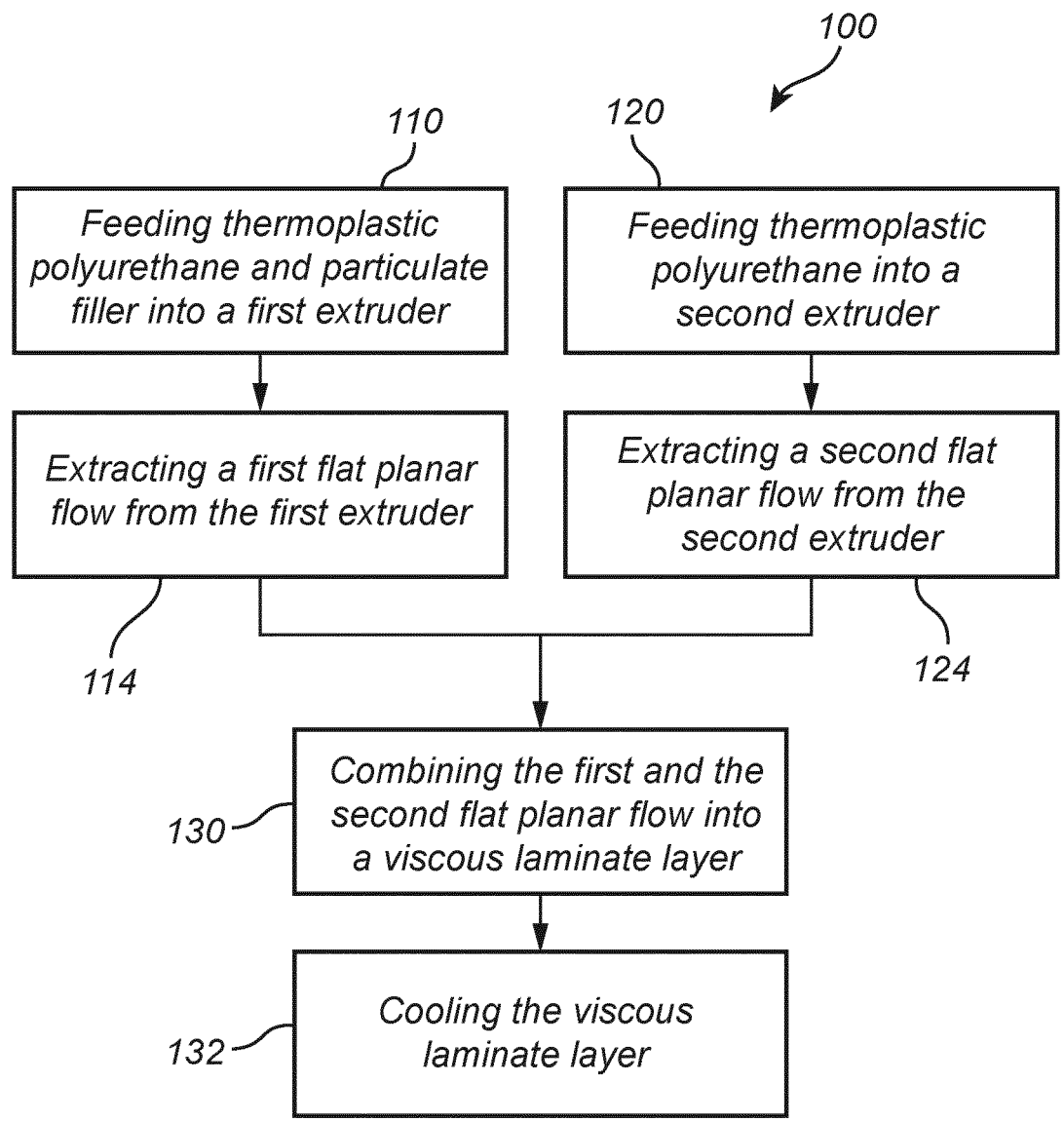
FIG. 19 illustrates a flowchart of a method for producing a tile

According to the inventive concept there is provided a method 100 for producing a tile 10 for reducing a radar wave reflection 4 from a surface 2. FIG. 19 illustrates a flowchart of such a method 100. Thermoplastic polyurethane and the particulate filler is herein fed 110 into a first extruder. Thermoplastic polyurethane is also fed 120 into a second extruder. The thermoplastic polyurethane may herein come in the form of e.g. pellets or powders which are fed into the extruder e.g. through hoppers. The thermoplastic polyurethane may subsequently be melted and mixed in the extruders by turning screws. The thermoplastic polyurethane may melt from the heat generated by the turning screws alone. Additional heaters may also be utilized. In the first extruder the particulate filler is subsequently mixed with the thermoplastic polyurethane. It should be understood that in the second extruder either no particulate filler or a small amount of particulate filler, e.g. 10% of the amount in the first extruder, may be mixed into the thermoplastic polyurethane. A first flat planar flow is then extracted 114 from the first extruder and a second flat planar flow is extracted 124 from the first extruder. The flat planar flows are extracted in the form of thin viscous layers with a particulate filler composition defined by the amount of filler and thermoplastic polyurethane introduced into the extruders. The viscous layers of the first and second flat planar flows are subsequently combined 130 into a viscous laminate layer. Extracting 114 a first flat planar flow, extracting 124 a second flat planar flow, and combining 130 the planar flows may be done in a co-extrusion die. A co-extrusion die for a two layer laminate may e.g. be shaped as a Y, with three branches. In such a co-extrusion die the melted thermoplastic polyurethane, with or without particulate filler, may enter through two separate branches which re-shapes the flows into separate flat viscous layers which subsequently merges into a viscous laminate layer in the third branch. The layer thicknesses may then be set by the thickness of the third branch and the relative speed and sizes of the extruders. Once the first and second flat planar flows have been combined 130 the resulting viscous laminate layer may be cooled 132 to form a solid laminate layer. On its path from the co-extrusion die the laminate layer may pass a number of rollers which chill the laminate layer and/or adjusts the total thickness of the laminate layer. Thus the process of solidifying the laminate layer may not be instantaneous as the laminate layer leaves the co-extrusion die. Additionally, the edges of the laminate layer may be trimmed such that the width of the laminate layer is defined. The solid laminate layer may subsequently be cut up into tiles 10 or wound up onto a windup roller for cutting into tiles 10 at a later stage. The method may be configured such that the laminate layer comprises a first layer 11 and a second layer 12, wherein the composition of the first layer 11 is defined by the composition of the melt in the first extruder and the composition of the second layer 12 is defined by the composition of the melt in the second extruder.

EXAMPLES

Figure 20:
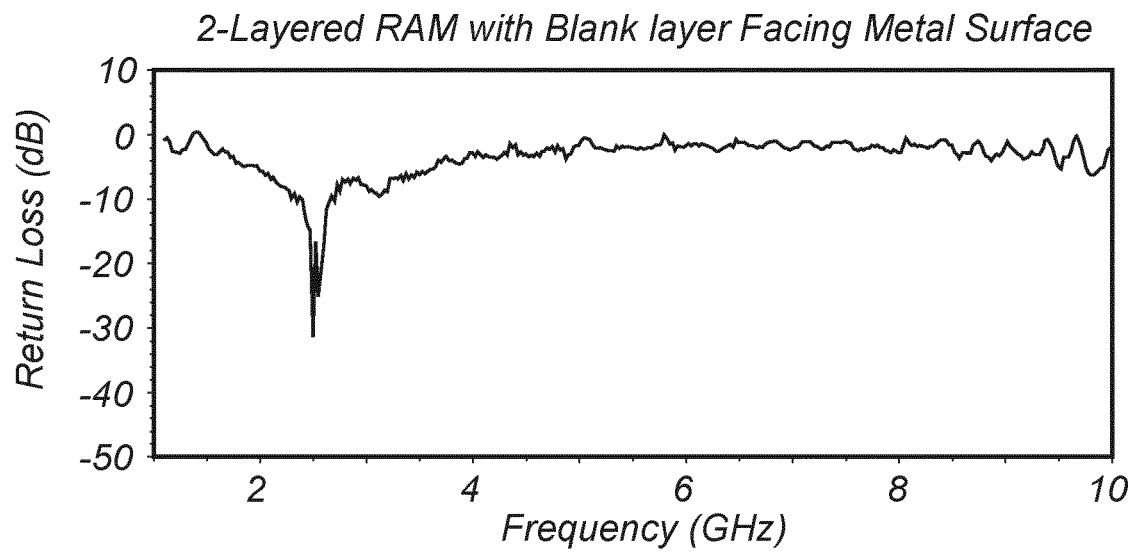
FIG. 20 is an absorption spectrum of a tile
Figure 21:
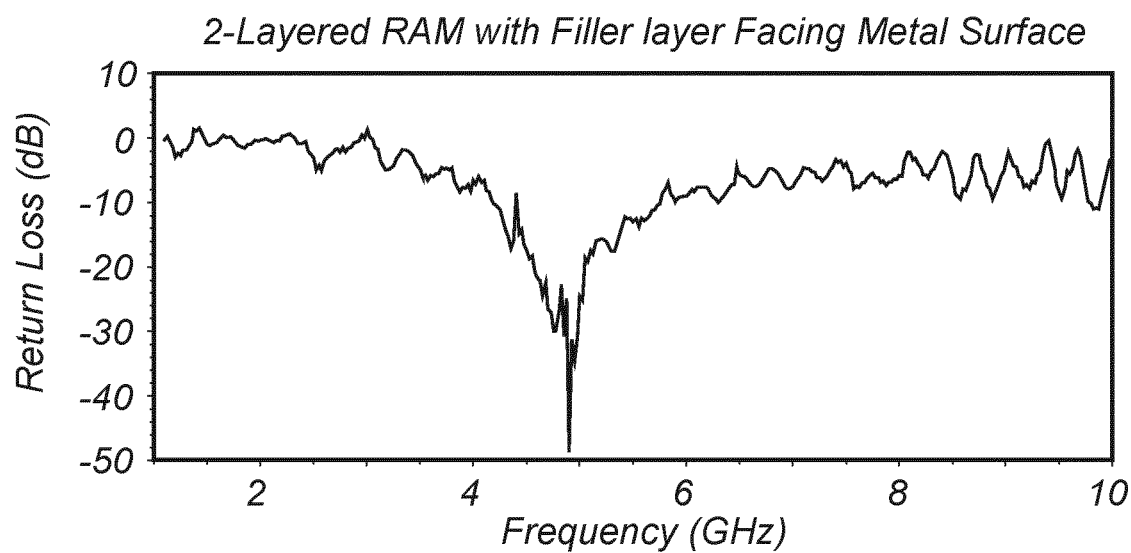
FIG. 21 is an absorption spectrum of a tile

An example of a tile 10 is a laminate of layers comprising a first 11 and a second 12 layer wherein both layers have a polymer matrix 20 of thermoplastic polyurethane, and wherein the first layer 11 contains particulate fillers 21 of ten to fifteen weight percent carbon black and three weight percent magnetite and wherein the second layer 12 contains no particulate fillers 21 with radar absorbing properties. The first layer has a thickness of 3.3 mm and the second layer has a thickness of 3.37 mm. The absorption spectrum of such a tile 10 with the second layer 12 attached to a metal surface 2 is shown in FIG. 20 wherein the central frequency of the absorption dip appears at 2.5 GHz, i.e. in the S-band. The absorption spectrum of such a tile 10 with the first layer 11 attached to a metal surface 2 is shown in FIG. 21 wherein the central frequency of the absorption dip appears at 4.9 GHz, i.e. in the C-band. The absorption spectra are herein measured by measuring the return loss of a radar wave impinging on the tile and subsequently being reflected back from the metal surface, thus passing the tile 10 twice.

Another example of a tile 10 is a laminate of layers comprising a first 11, a second 12 and a third 13 layer wherein all layers have a polymer matrix 20 of thermoplastic polyurethane, and wherein the first layer 11 and the third layer 13 contains particulate fillers 21 of ten to fifteen weight percent carbon black and three weight percent magnetite, and wherein the second layer 12 contains no particulate fillers 21 with radar absorbing properties. The first layer 11 has a thickness of 2.44 mm, the second layer 12 has a thickness of 3.37 mm and the third layer 13 has a thickness of 1.14 mm.

Another example of a tile 10 is a laminate of layers comprising a first 11 and a second 12 layer wherein both layers have a polymer matrix 20 of thermoplastic polyurethane, and wherein the first layer 11 contains particulate fillers 21 of ten to fifteen weight percent carbon black and three weight percent MIL-100(Fe) and wherein the second layer 12 contains no particulate fillers 21 with radar absorbing properties. The first layer has a thickness of 3.3 mm and the second layer has a thickness of 3.37 mm. Herein MIL-100(Fe) is a metal-organic framework.

Figure 22:
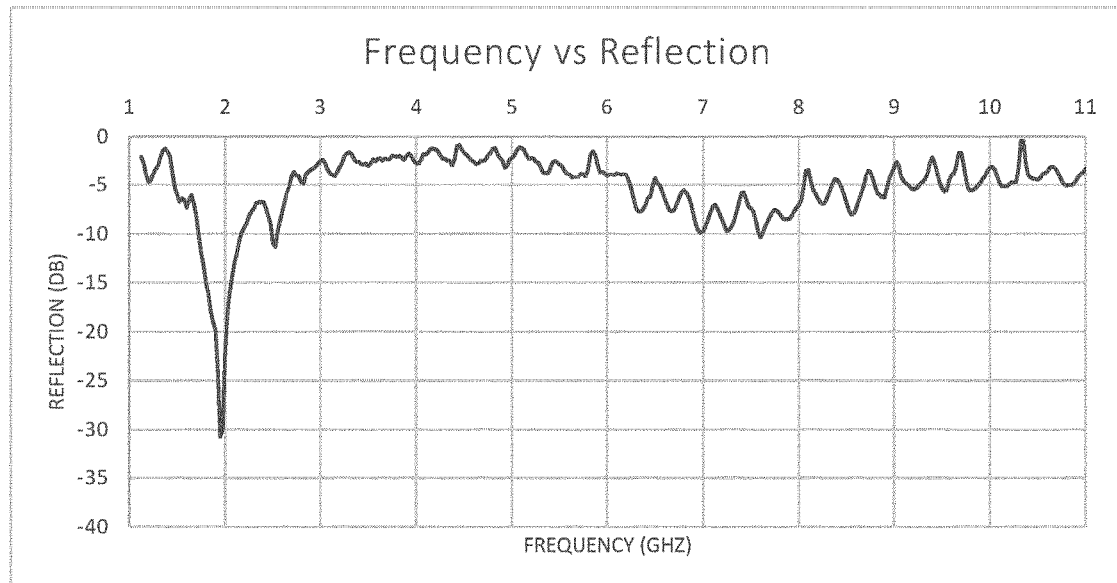
FIG. 22 is an absorption spectrum of a tile
Figure 23:
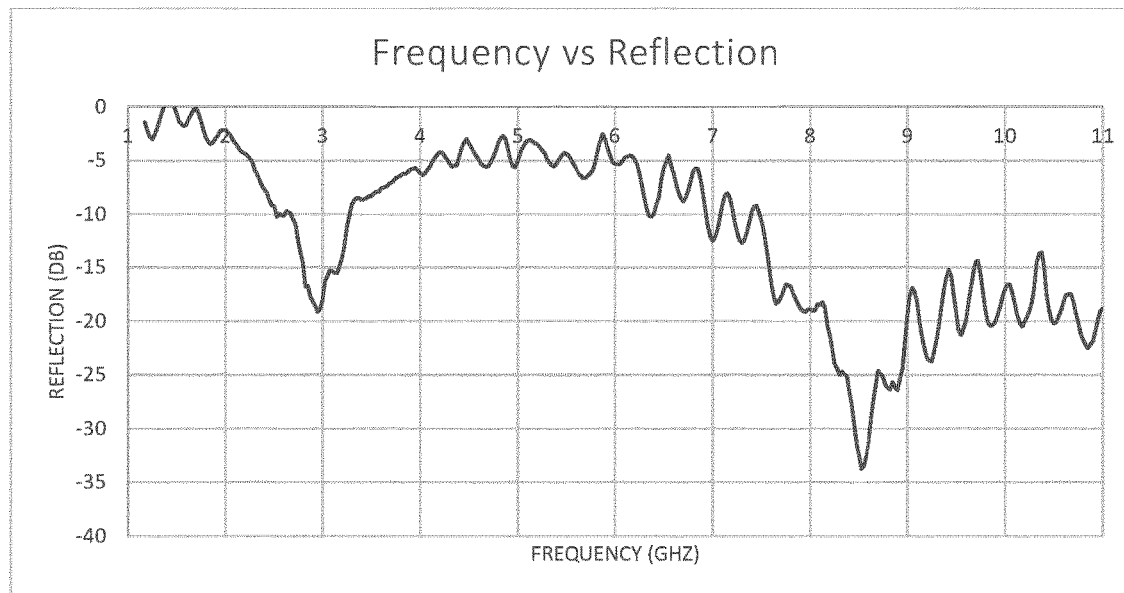
FIG. 23 is an absorption spectrum of a tile

Another example of a tile 10 is a laminate of layers comprising a first 11 and a second 12 layer wherein both layers have a polymer matrix 20 of thermoplastic polyurethane, and wherein the first layer 11 contains particulate fillers 21 of ten to fifteen weight percent carbon black and three weight percent magnetite and wherein the second layer 12 contains no particulate fillers 21 with radar absorbing properties. The first layer has a thickness of 6.64 mm and the second layer has a thickness of 3.37 mm. The absorption spectrum of such a tile 10 with the second layer 12 attached to a metal surface 2 is shown in FIG. 22 wherein the central frequency of the absorption dip appears at 2 GHz, i.e. in the S-band. The absorption spectrum of such a tile 10 with the first layer 11 attached to a metal surface 2 is shown in FIG. 23 wherein an absorption dip appears at 8.5 GHz, i.e. in the X-band. The absorption spectra are herein measured by measuring the return loss of a radar wave impinging on the tile and subsequently being reflected back from the metal surface, thus passing the tile 10 twice.

Figure 24:
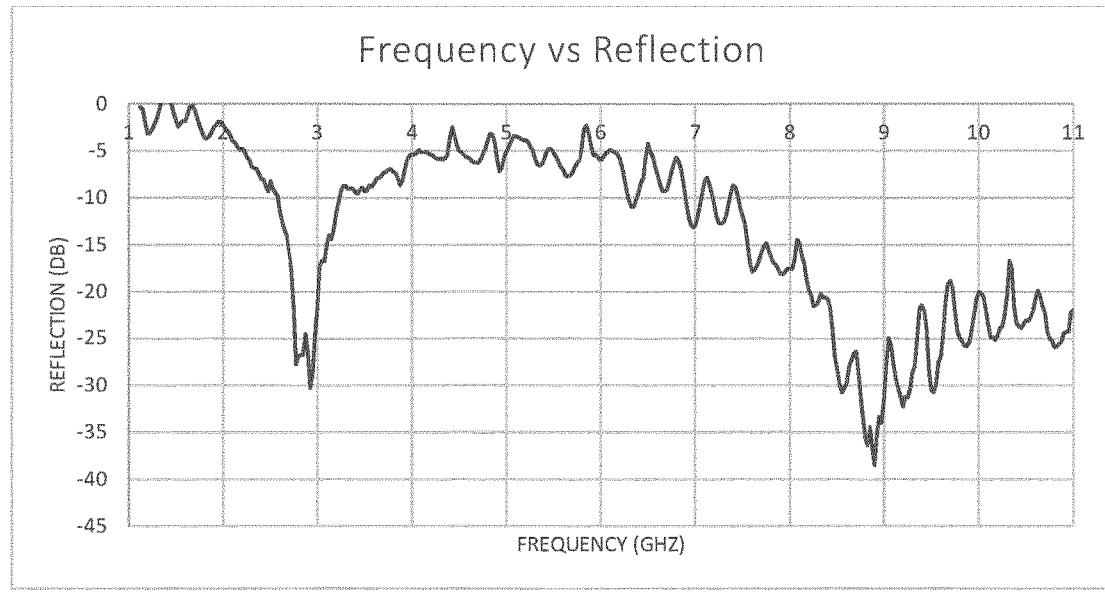
FIG. 24 is an absorption spectrum of a tile

Another example of a tile 10 is a laminate of layers comprising a first 11 and a second 12 layer wherein both layers have a polymer matrix 20 of thermoplastic polyurethane, and wherein the first layer 11 contains particulate fillers 21 of ten to fifteen weight percent carbon black and three weight percent magnetite and wherein the second layer 12 contains no particulate fillers 21 with radar absorbing properties. The first layer has a thickness of 5.0 mm and the second layer has a thickness of 4.08 mm. The absorption spectrum of such a tile 10 with the first layer 11 attached to a metal surface 2 is shown in FIG. 24 wherein one absorption dip appears at 2.9 GHz, i.e. in the S-band, and another absorption dip appears at 8.9 GHz, i.e. in the X-band. The absorption spectra are herein measured by measuring the return loss of a radar wave impinging on the tile and subsequently being reflected back from the metal surface, thus passing the tile 10 twice.

Figure 25:
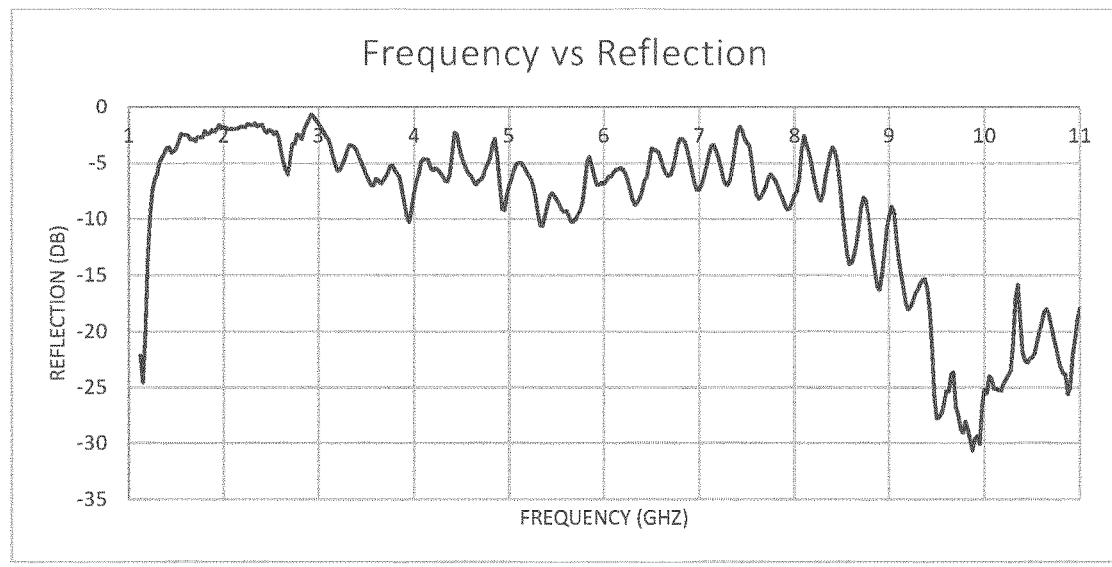
FIG. 25 is an absorption spectrum of a tile

Another example of a tile 10 is a laminate of layers comprising a first 11 and a second 12 layer wherein both layers have a polymer matrix 20 of thermoplastic polyurethane, and wherein the first layer 11 contains particulate fillers 21 of ten to fifteen weight percent carbon black and three weight percent magnetite and wherein the second layer 12 contains no particulate fillers 21 with radar absorbing properties. The first layer has a thickness of 7.5 mm and the second layer has a thickness of 7.5 mm. The absorption spectrum of such a tile 10 with the first layer 11 attached to a metal surface 2 is shown in FIG. 25 wherein one absorption dip appears at 1.1 GHz, i.e. in the L-band, and another absorption dip appears at 9.9 GHz, i.e. in the X-band. The absorption spectra are herein measured by measuring the return loss of a radar wave impinging on the tile and subsequently being reflected back from the metal surface, thus passing the tile 10 twice.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A tile for reducing a radar wave reflection from a surface, the tile being a flexible surface sheet which is adhesively attachable to the surface,
   wherein the flexible surface sheet reduces the radar wave reflection from the surface at a frequency, the frequency being a frequency between 1 gigahertz (GHz) and 12 GHz; and,
   wherein the flexible surface sheet is a laminate of layers, wherein both a top surface and a bottom surface of the flexible surface sheet are adapted to be adhesively attachable to the surface, and
   wherein the laminate of layers comprises:
      a first layer comprising a polymer matrix into which a particulate filler is dispersed, wherein the particulate filler has radar absorbing properties; and
      a second layer comprising a polymer matrix, the second layer adjoining the first layer,
   wherein the first layer is located closer to the top surface of the flexible surface sheet than the second layer and the second layer is located closer to the bottom surface of the flexible surface sheet than the first layer;
   wherein the flexible surface sheet is either
      adapted such that in case the bottom surface of the flexible surface sheet is adhesively attached to the surface an S-band radar reflection of the surface is reduced, and in case the top surface of the flexible surface sheet is adhesively attached to the surface an X-band radar reflection of the surface is reduced, the S-band radar reflection having a frequency between 2 GHz and 4 GHz, the X-band radar reflection having a frequency between 8 GHz and 12 GHz; or adapted such that in case the bottom surface of the flexible surface sheet is adhesively attached to the surface an S-band radar reflection of the surface is reduced, and in case the top surface of the flexible surface sheet is adhesively attached to the surface a C-band radar reflection of the surface is reduced, the S-band radar reflection having a frequency between 2 GHz and 4 GHz, the C-band radar reflection having a frequency between 4 GHz and 8 GHz.

2. The tile according to claim 1, wherein the laminate of layers solely comprises the first and the second layer, and wherein the first layer forms the top surface of the flexible surface sheet and the second layer forms the bottom surface of the flexible surface sheet.

3. The tile according to claim 1, wherein the laminate of layers further comprises:
a third layer comprising a polymer matrix into which a particulate filler is dispersed, wherein the particulate filler has radar absorbing properties,
wherein the third layer adjoins the second layer on a side opposite to the first layer, such that the second layer is sandwiched between the first layer and the third layer.

4. The tile according to claim 2,
wherein a first layer thickness is between 70% and 130% of a second layer thickness, wherein the first layer thickness is the thickness of the first layer and the second layer thickness is the thickness of the second layer.

5. The tile according to claim 1, wherein the particulate filler comprises particles of a metal-organic framework.

6. The tile according to claim 1, wherein the particulate filler comprises both particles that interact with an electric field of a radar wave and particles that interact with a magnetic field of the radar wave.

7. The tile according to claim 1, wherein the particulate filler comprises aggregate particles, said aggregate particles comprising both material that interact with the electric field of a radar wave and material that interact with the magnetic field of the radar wave.

8. The tile according to claim 7,
wherein the aggregate particles comprise core/shell particles, the core/shell particles having either:
a ferrite core and at least a partial shell of a metal-organic framework, or a metal-organic framework core and at least a partial shell of ferrite.

9. The tile according to claim 7,
wherein the aggregate particles comprise ferrite-decorated graphene flakes.

10. The tile according to claim 7,
wherein the aggregate particles comprise core/shell particles, the core/shell particles having a ferrite core and at least a partial shell of a conductive polymer.

11. The tile according to claim 1, wherein a thermoplastic polyurethane layer of the tile is produced by extrusion.

12. The tile according to claim 1, wherein the polymer matrix of all the laminate layers is thermoplastic polyurethane.

13. The tile according to claim 1, wherein at least two adjoining layers of the laminate layers are produced by co-extrusion.

14. The tile according to claim 1, wherein the tile is adapted to be attached to a tower or a blade of a wind turbine.

15. The tile according to claim 1,
wherein a first layer thickness is between 70% and 130% of a second layer thickness, wherein the first layer thickness is the thickness of the first layer and the second layer thickness is the thickness of the second layer.

* * * * *